US012759666B2

(12) United States Patent
Tan et al.

(10) Patent No.: US 12,759,666 B2
(45) Date of Patent: Oct. 13, 2026

(54) COUPLING UNIT FOR PEDAL ASSEMBLY, AND PEDAL

(71) Applicant: Shimano Inc., Osaka (JP)

(72) Inventors: Zheng Chuan Tan, Pontian (MY); Yoong Chern Chai, Pontian (MY); Mohamad Zaki Bin Md Salleh, Pontian (MY)

(73) Assignee: Shimano Inc., Osaka (JP)

( * ) Notice: Subject to any disclaimer, the term of this patent is extended or adjusted under 35 U.S.C. 154(b) by 0 days.

(21) Appl. No.: 18/374,802

(22) Filed: Sep. 29, 2023

(65) Prior Publication Data

US 2025/0108881 A1 Apr. 3, 2025

(51) Int. Cl.
*B62M 3/08* (2006.01)

(52) U.S. Cl.
CPC .................................. *B62M 3/086* (2013.01)

(58) Field of Classification Search
CPC ................................ B62M 3/08; B62M 3/086
See application file for complete search history.

(56) References Cited

U.S. PATENT DOCUMENTS 5,003,841 A * 4/1991 Nagano .................... B62M 3/08 74/594.6
5,755,144 A * 5/1998 Ueda ...................... B62M 3/086 36/131
6,196,084 B1 3/2001 Ueda
7,225,703 B2 * 6/2007 Winefordner ............ B62M 3/08 74/594.4
7,856,905 B2 * 12/2010 Hsieh ..................... B62M 3/086 74/594.6
9,963,194 B2 5/2018 Hsieh
10,207,769 B1 * 2/2019 Chen ...................... B62M 3/086
10,710,674 B2 * 7/2020 Inoue ..................... B62M 3/086
10,787,226 B1 * 9/2020 Chen ...................... B62M 3/086
D953,209 S 5/2022 Liu (Continued)

FOREIGN PATENT DOCUMENTS

CN 220032136 U * 11/2023
DE 202011000814 U1 * 12/2011 ............ B62M 3/086

(Continued)

OTHER PUBLICATIONS

Machine translation of DE 102012206324 A1 obtained on Sep. 3, 2025.*

*Primary Examiner* — Adam D Rogers
(74) *Attorney, Agent, or Firm* — Spencer Fane, LLP

(57) ABSTRACT

A coupling unit releasably couples a cleat of a shoe to a pedal assembly. The coupling unit includes a first coupling member, a second coupling member and a shaft. The first coupling member and the second coupling member are configured to releasably couple the cleat to the coupling unit. The first coupling member has a pair of holes. The second coupling member has a pair of holes. The second coupling member is pivotably coupled to the first coupling member by the shaft. The shaft is disposed in the holes such that the second coupling member is pivotally coupled to the first coupling member by the shaft. In one embodiment, the shaft is press-fitted to at least one of the holes. In another embodiment, the shaft has opposite axial ends crimp-fastened to one of the first coupling member and the second coupling member.

19 Claims, 14 Drawing Sheets

(56) References Cited

U.S. PATENT DOCUMENTS

| | | | | |
|---|---|---|---|---|
| 12,246,794 | B2 * | 3/2025 | Chen | B62M 3/086 |
| 2005/0284253 | A1 * | 12/2005 | Hervig | B62M 3/086 74/594.6 |
| 2012/0167711 | A1 * | 7/2012 | Hsieh | B62M 3/086 74/594.6 |

FOREIGN PATENT DOCUMENTS

| | | | | |
|---|---|---|---|---|
| DE | 102012206324 | A1 * | 10/2012 | B62M 3/086 |
| DE | 102018100524 | A1 * | 7/2019 | B62M 3/086 |

* cited by examiner

COUPLING UNIT FOR PEDAL ASSEMBLY, AND PEDAL

BACKGROUND

Technical Field

This disclosure generally relates to a coupling unit for a pedal assembly, and a pedal. More specifically, the present disclosure relates to a coupling unit for a pedal assembly that is configured to be used with a human-powered vehicle, and a pedal including the coupling unit.

Background Information

Pedals have been designed for specific purposes such as for comfort, recreational biking, off-road biking, road racing, exercising, etc. One particular type of pedal, which is gaining more popularity, is the step-in or clipless pedal. A conventional step-in or clipless pedal is releasably coupled to a cleat that is secured to the sole of a user's shoe. Thus, the bottom of the user's shoe is fixed to the pedal for transmitting the pedaling force from the user to the pedal. In other words, with clipless pedals, the shoes and the pedals are in a state of constant engagement when the cleats are engaged in a cleat securing mechanism, so the pedaling force can be transmitted efficiently to the pedals. A conventional clipless pedal includes a pedal axle that can be attached to a crank of a human-powered vehicle, a main pedal body rotatably supported on the pedal axle, and a cleat coupling unit. With such a conventional bicycle pedal, a cleat disengagement operation is typically executed by twisting the shoe so that the heel of the shoe moves outward while the shoe is coupled to the pedal.

SUMMARY

Generally, the present disclosure is directed to various features of a coupling unit for a pedal assembly configured to be used with a human-powered vehicle. The term "human-powered vehicle" as used herein refers to a vehicle that can be propelled by at least human driving force to produce propulsion, but does not include a vehicle using only a driving power other than human power. In particular, a vehicle solely using an internal combustion engine as a driving power is not included in the human-powered vehicle. The human-powered vehicle is generally assumed to be a compact, light vehicle that sometimes does not require a license for driving on a public road. The number of wheels on the human-powered vehicle is not limited. The human-powered vehicle includes, for example, a monocycle and a vehicle having three or more wheels. The human-powered vehicle includes, for example, various types of bicycles such as a mountain bike, a road bike, a city bike, a cargo bike, and a recumbent bike, and an electric assist bicycle (E-bike).

In view of the state of the known technology and in accordance with a first aspect of the present disclosure, a coupling unit is provided for a pedal assembly. The pedal assembly is configured to be used with a human-powered vehicle. The coupling unit releasably couples a cleat of a shoe to the pedal assembly. The coupling unit basically comprises a first coupling member, a second coupling member and a shaft. The first coupling member is configured to releasably couple the cleat to the coupling unit. The first coupling member is configured to be disposed to a pedal body of the pedal assembly. The first coupling member has a first hole and a second hole. The second coupling member is configured to releasably couple the cleat to the coupling unit. The second coupling member is pivotable between a cleat holding position and a cleat non-holding position. The second coupling member is coupled to the first coupling member. The second coupling member has a third hole and a fourth hole. The shaft has a center axis. The shaft is disposed in the first hole, the second hole, the third hole and the fourth hole such that the second coupling member is pivotable about the center axis. The shaft is press-fitted to at least one of the first hole, the second hole, the third hole and the fourth hole. The shaft is press-fitted to the first hole in a case where the shaft is press-fitted to the second hole or in a case where the shaft is loose-fitted to the second hole, the third hole and the fourth hole. The shaft is press-fitted to the second hole in a case where the shaft is loose-fitted to the first hole, the third hole and the fourth hole. The shaft is press-fitted to the third hole in a case where the shaft is press-fitted to the fourth hole or in a case where the shaft is loose-fitted to the first hole, the second hole and the fourth hole. The shaft is press-fitted to the fourth hole in a case where the shaft is loose-fitted to the first hole, the second hole and the third hole.

With the coupling unit according to the first aspect, the first coupling member and the second coupling member can be easily and reliably coupled together with the shaft.

In accordance with a second aspect of the present disclosure, a coupling unit is provided for a pedal assembly. The pedal assembly is configured to be used with a human-powered vehicle. The coupling unit releasably couples a cleat of a shoe to the pedal assembly. The coupling unit basically comprises a first coupling member, a second coupling member and a shaft. The first coupling member is configured to releasably couple the cleat to the coupling unit. The first coupling member is configured to be disposed to a pedal body of the pedal assembly. The first coupling member has a first hole and a second hole. The second coupling member is configured to releasably couple the cleat to the coupling unit. The second coupling member is pivotable between a cleat holding position and a cleat non-holding position. The second coupling member is coupled to the first coupling member. The second coupling member has a third hole and a fourth hole. The shaft has a center axis. The shaft is disposed in the first hole, the second hole, the third hole and the fourth hole such that the second coupling member is pivotable about the center axis. The shaft has a first axial end and a second axial end opposite to the first axial end. Both of the first axial end and the second axial end are crimp-fastened to one of the first coupling member and the second coupling member.

With the coupling unit according to the second aspect, the first coupling member and the second coupling member can be easily and reliably coupled together with the shaft.

In accordance with a third aspect of the present disclosure, the coupling unit according to the first aspect or the second aspect further comprises a biasing member biasing the second coupling member towards the cleat holding position.

With the coupling unit according to the third aspect, the second coupling member can be reliably returned to the cleat holding position to secure the cleat after a cleat engagement operation and/or a cleat disengagement operation.

In accordance with a fourth aspect of the present disclosure, the coupling unit according to any one of the first aspect to the third aspect is configured so that the first coupling member includes an outer portion and an inner portion, and both of the inner portion and the outer portion curve toward each other.

With the coupling unit according to the fourth aspect, an increase in a lateral width of the coupling unit can be suppressed.

In accordance with a fifth aspect of the present disclosure, the coupling unit according to the fourth aspect is configured so that a curvature of the inner portion is different from a curvature of the outer portion.

With the coupling unit according to the fifth aspect, improper attachment of the coupling unit to a pedal body can be reliably prevented.

In accordance with a sixth aspect of the present disclosure, the coupling unit according to the fourth aspect or the fifth aspect is configured so that the outer portion includes an outer engagement recess configured to engage with another positioning profile of the pedal body, and the inner portion includes an inner engagement recess configured to engage with a positioning profile of the pedal body.

With the coupling unit according to the sixth aspect, the coupling unit can be easily positioned to the pedal body.

In accordance with a seventh aspect of the present disclosure, the coupling unit according to the sixth aspect is configured so that the inner engagement recess is different from the outer engagement recess in shape.

With the coupling unit according to the seventh aspect, improper attachment of the coupling unit to a pedal body can be reliably prevented.

In accordance with an eighth aspect of the present disclosure, the coupling unit according to any one of the first aspect to the seventh aspect is configured so that the first hole is disposed adjacent to the third hole with respect to an axial direction defined by the center axis of the shaft, and the second hole is adjacent to the fourth hole with respect to the axial direction.

With the coupling unit according to the eighth aspect, the first coupling member and the second coupling member can be easily provided to the shaft.

In accordance with a ninth aspect of the present disclosure, the coupling unit according to any one of the first aspect to the eighth aspect is configured so that the shaft is press-fitted to the first hole and the second hole.

With the coupling unit according to the ninth aspect, the shaft is fixed to the first coupling member to prevent axial movement of the shaft relative to the first coupling member.

In accordance with a tenth aspect of the present disclosure, the coupling unit according to any one of the first aspect to the ninth aspect is configured so that the shaft is press-fitted to the third hole and the fourth hole.

With the coupling unit according to the tenth aspect, the shaft is fixed to the second coupling member to prevent axial movement of the shaft relative to the second coupling member.

In accordance with an eleventh aspect of the present disclosure, the coupling unit according to any one of the first aspect to the tenth aspect is configured so that the first coupling member includes a first pedal mounted portion, a second pedal mounted portion, and a cleat engagement portion. The cleat engagement portion connects the first pedal mounted portion and the second pedal mounted portion.

With the coupling unit according to the eleventh aspect, the cleat engagement portion of the first coupling member appropriately located relative to a pedal body, and the first coupling member can be securely attached to the pedal body.

In accordance with a twelfth aspect of the present disclosure, the coupling unit according to any one of the third aspect to the eleventh aspect is configured so that the biasing member is disposed on the shaft.

With the coupling unit according to the twelfth aspect, the biasing member can reliably bias the second coupling member towards the cleat holding position, and the biasing member remains attached to the rest of the coupling unit when the coupling unit is detached from the pedal.

In accordance with a thirteenth aspect of the present disclosure, the coupling unit according to the twelfth aspect is configured so that the biasing member includes a plurality of springs operatively disposed between the first coupling member and the second coupling member.

With the coupling unit according to the thirteenth aspect, the biasing member can reliably bias the second coupling member towards the cleat holding position with an appropriate biasing force.

In accordance with a fourteenth aspect of the present disclosure, the coupling unit according to the thirteenth aspect is configured so that each of the plurality of springs includes a coil portion disposed on the shaft.

With the coupling unit according to the fourteenth aspect, the coil portions of the springs exert a force on the shaft to aid in reducing inadvertent axial movement of the shaft relative to the first coupling member and the second coupling member.

In accordance with a fifteenth aspect of the present disclosure, the coupling unit according to any one of the third aspect to the fourteenth aspect further comprises a biasing force adjuster disposed between the biasing member and the second coupling member.

With the coupling unit according to the fifteenth aspect, the biasing force of the biasing member can be customized by the user.

In accordance with a sixteenth aspect of the present disclosure, the coupling unit according to the second aspect further comprises a biasing member biasing the second coupling member towards the cleat holding position.

With the coupling unit according to the sixteenth aspect, the second coupling member can be reliably returned to the cleat holding position to secure the cleat after a cleat engagement operation and/or a cleat disengagement operation.

In accordance with a seventeenth aspect of the present disclosure, a pedal comprises the coupling unit according to any one of the first aspect to the sixteenth aspect, a pedal axle and a pedal body. The pedal axle has a rotational center axis. The pedal body is rotatably supported with respect to the pedal axle to rotate around the rotational center axis. The coupling unit is attached to the pedal body.

With the pedal according to the seventeenth aspect, the coupling unit can be easily attached to the pedal body of the pedal.

In accordance with an eighteenth aspect of the present disclosure, a pedal comprises the coupling unit according to the second aspect, a pedal axle and a pedal body. The pedal axle has a rotational center axis. The pedal body is rotatably supported with respect to the pedal axle to rotate around the rotational center axis. The coupling unit is attached to the pedal body.

With the pedal according to the eighteenth aspect, the coupling unit can be easily attached to the pedal body of the pedal.

In accordance with a nineteenth aspect of the present disclosure, the pedal according to the eighteenth aspect is configured so that the coupling unit further comprises a biasing member biasing the second coupling member towards the cleat holding position.

With the pedal according to the nineteenth aspect, the second coupling member can be reliably returned to the cleat holding position to secure the cleat after a cleat engagement operation and/or a cleat disengagement operation.

Also, other objects, features, aspects and advantages of the disclosed coupling unit for a pedal assembly, and the disclosed pedal will become apparent to those skilled in the art from the following detailed description, which, taken in conjunction with the annexed drawings, discloses preferred embodiments of the coupling unit and the pedal.

BRIEF DESCRIPTION OF THE DRAWINGS

Referring now to the attached drawings which form a part of this original disclosure.

DETAILED DESCRIPTION

Selected embodiments will now be explained with reference to the drawings. It will be apparent to those skilled in the human-powered vehicle field (e.g., the bicycle field) from this disclosure that the following descriptions of the embodiments are provided for illustration only and not for the purpose of limiting the invention as defined by the appended claims and their equivalents.

Figure 1:
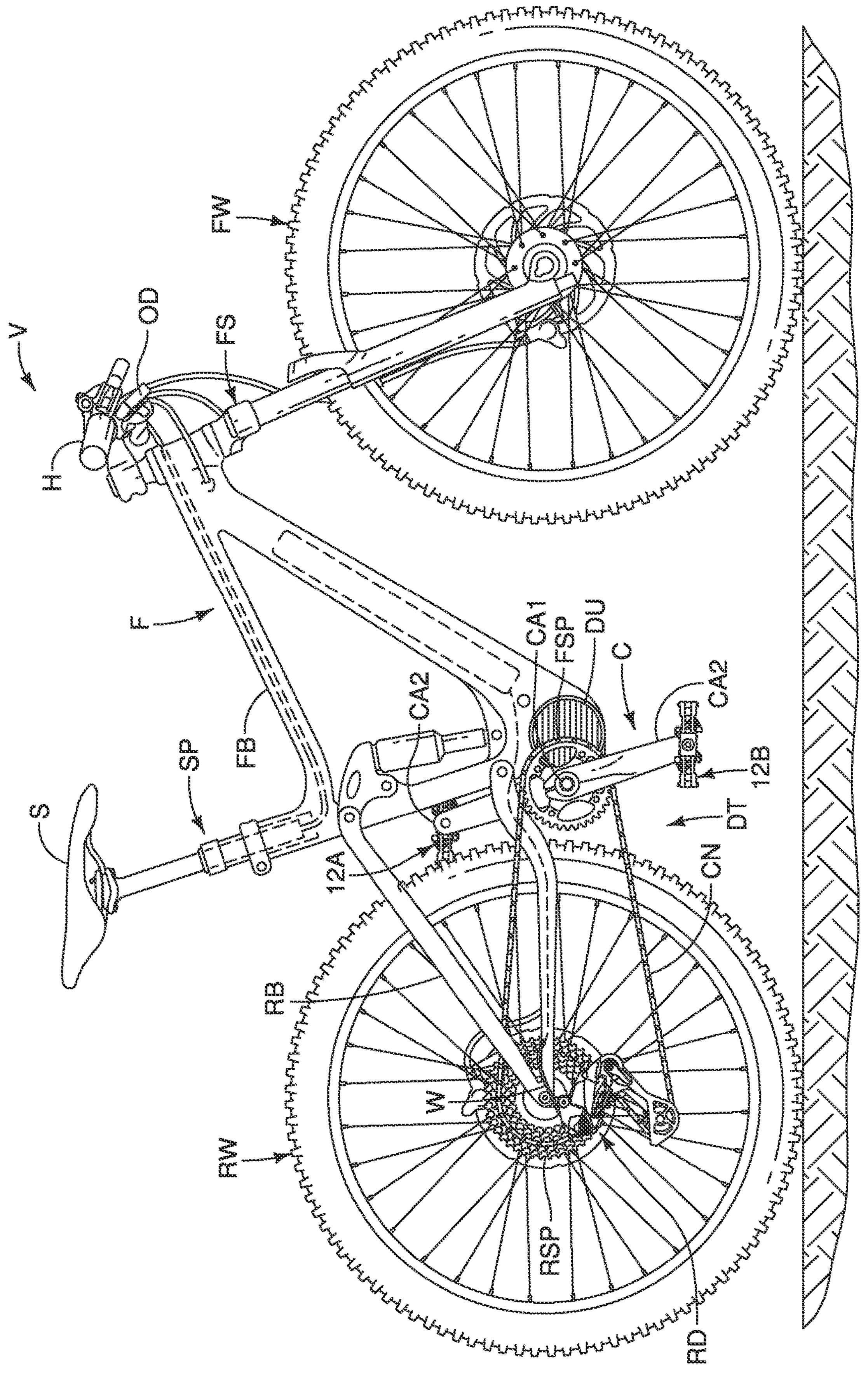
FIG. 1 is a side elevational view of a human-powered vehicle (e.g., a bicycle) equipped a pedal assembly including a pair of pedals that each has a coupling unit in accordance with a first embodiment of the present disclosure.

Referring initially to FIG. 1, a human-powered vehicle V (e.g., a bicycle) is illustrated that is equipped with a pedal assembly 10 in accordance with a first embodiment. In other words, the pedal assembly 10 is configured to be used with a human-powered vehicle V. For example, the human-powered vehicle V is a bicycle. In the illustrated embodiment, for example, the human-powered vehicle V is an electric assist mountain bike (i.e., an off-road bicycle). Alternatively, the human-powered vehicle V can be a road bicycle, a city bike, a cargo bike, and a recumbent bike, or another type of off-road bicycle such as a cyclocross bicycle. The number of wheels on the human-powered vehicle V is not limited. The human-powered vehicle V includes, for example, a monocycle and a vehicle having three or more wheels. Here, the human-powered vehicle V is a bicycle that at least partially uses human power as a driving power for traveling and includes an electric drive unit assisting the human power. In particular, a vehicle using solely an internal combustion engine as driving power is not included in the human-powered vehicle of this disclosure. More specifically, in the embodiments described below, the human-powered vehicle V is an electric assist bicycle (E-bike).

As seen in FIG. 1, the human-powered vehicle V includes a vehicle body VB that is equipped with a plurality of vehicle components. As seen in FIG. 1, the vehicle body VB has a front frame body FB and a rear frame body RB (a swing arm) swingably mounted to a rear section of the front frame body FB such that the rear frame body RB can pivot with respect to the front frame body FB. A rear wheel RW is mounted to the rear frame body RB and a front wheel FW is mounted to the front frame body FB via a front suspension FS. A bicycle seat or saddle S is adjustably mounted to the front frame body FB by an adjustable seatpost SP. A rear suspension RS is provided between the front frame body FB and the rear frame body RB to control the movement of the rear frame body RB with respect to the front frame body FB. Namely, the rear suspension RS is configured to absorb a shock imparted to the rear wheel RW. The front suspension FS is pivotally mounted to a head tube of the front frame body FB. A handlebar H is mounted to an upper end of a steering column steerer tube of the front suspension FS. The front suspension FS is configured to absorb a shock imparted to the front wheel FW. The front wheel FW is mounted to a lower end of the front suspension FS. The rear wheel RW is mounted to a rear end of the rear frame body RB.

The human-powered vehicle V further includes a drivetrain DT and a drive unit DU operatively coupled to the drivetrain DT. The drive unit DU is also referred to as an electric assist unit. Here, for example, the drivetrain DT is a chain-drive type that includes a crank C, a front sprocket FSP, a plurality of rear sprockets RSP and a chain CN. The crank C includes a crank axle CA1 and a pair of crank arms CA2. The crank axle CA1 is rotatably supported to the front frame body FB via the electric assist unit DU. The crank arms CA2 are provided on opposite ends of the crank axle CA1.

A pedal 12A is rotatably coupled to the distal end of one of the crank arms CA2, and a pedal 12B is rotatably coupled to the distal end of the other one of the crank arms CA2. The pedal assembly 10 basically comprises the pedals 12A and 12B. The drivetrain DT can be selected from any type, and can be a belt-drive type or a shaft-drive type. Here, the human-powered vehicle V further includes a front derailleur FD that is attached to the front frame body FB for shifting the chain CN between the front sprockets FSP, and a rear derailleur RD that is attached to the rear frame body RB for shifting the chain CN between the rear sprockets RSP. The front derailleur FD and the rear derailleur RD are one type of gear changing device or transmission device for change a gear ratio of the drivetrain DT.

The front sprocket FSP is provided on the crank C to rotate integrally with the crank axle CA1. The rear sprockets RSP are provided on a hub HR of the rear wheel RW. The chain CN runs around the front sprocket FSP and the rear sprockets RSP. A human driving force is applied to the pedals 12A and 12B by a rider or user of the human-powered vehicle V such that the driving force is transmitted via the front sprocket FSP, the chain CN and the rear sprockets RSP to the rear wheel RW.

The drive unit DU is actuated to assist in propulsion of the human-powered vehicle V in a conventional manner. The drive unit DU is actuated, for example, in accordance with a human driving force applied to the pedals 12A and 12B. The drive unit DU includes an electric motor that is operatively coupled to the front sprocket FSP. The drive unit DU is actuated by electrical power that is supplied from a power supply PS.

Figure 2:
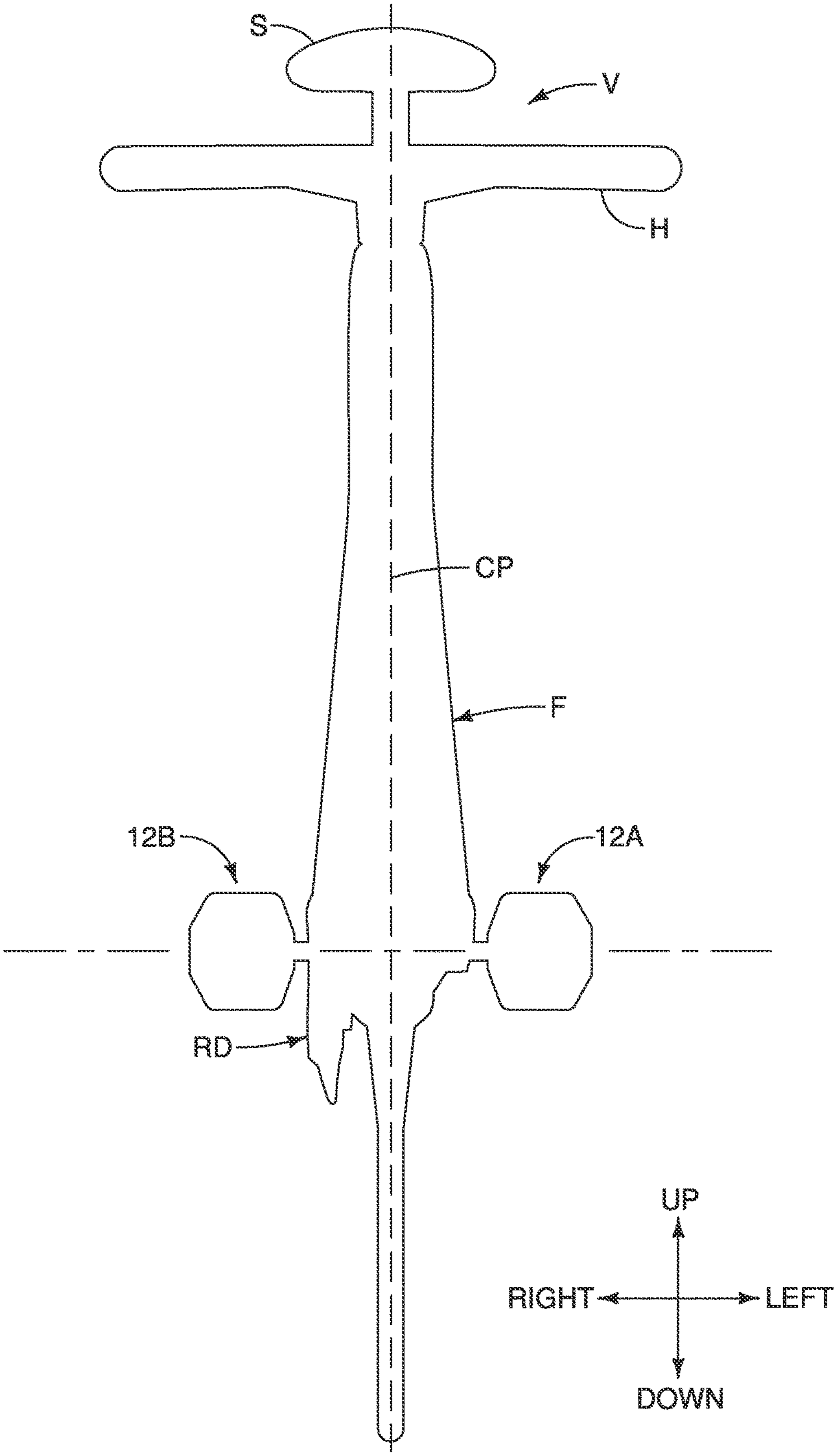
FIG. 2 is an outline of the human-powered vehicle (e.g., a bicycle) equipped with the pedal assembly illustrated in FIG. 1 as viewed from in front of the human-powered vehicle and along a longitudinal direction to show a center plane vertically bisecting a frame of the human-powered vehicle.

Referring to FIG. 2, an outline of the human-powered vehicle V is illustrated as viewed from in front of the human-powered vehicle V and along a longitudinal direction to show a center plane CP vertically bisecting the frame F of the human-powered vehicle V. The center plane CP passes through a center of the frame F in a width direction of the frame F. The center plane CP separates a left side from a right side of the human-powered vehicle V. The following directional terms "front," "rear," "forward," "rearward," "left," "right," "lateral," "longitudinal", "upward," and "downward," as well as any other similar directional terms, refer to those directions which are determined on the basis of a rider sitting upright on the seat S of the human-powered vehicle V while facing the handlebar H of the human-powered vehicle V.

Figure 3:
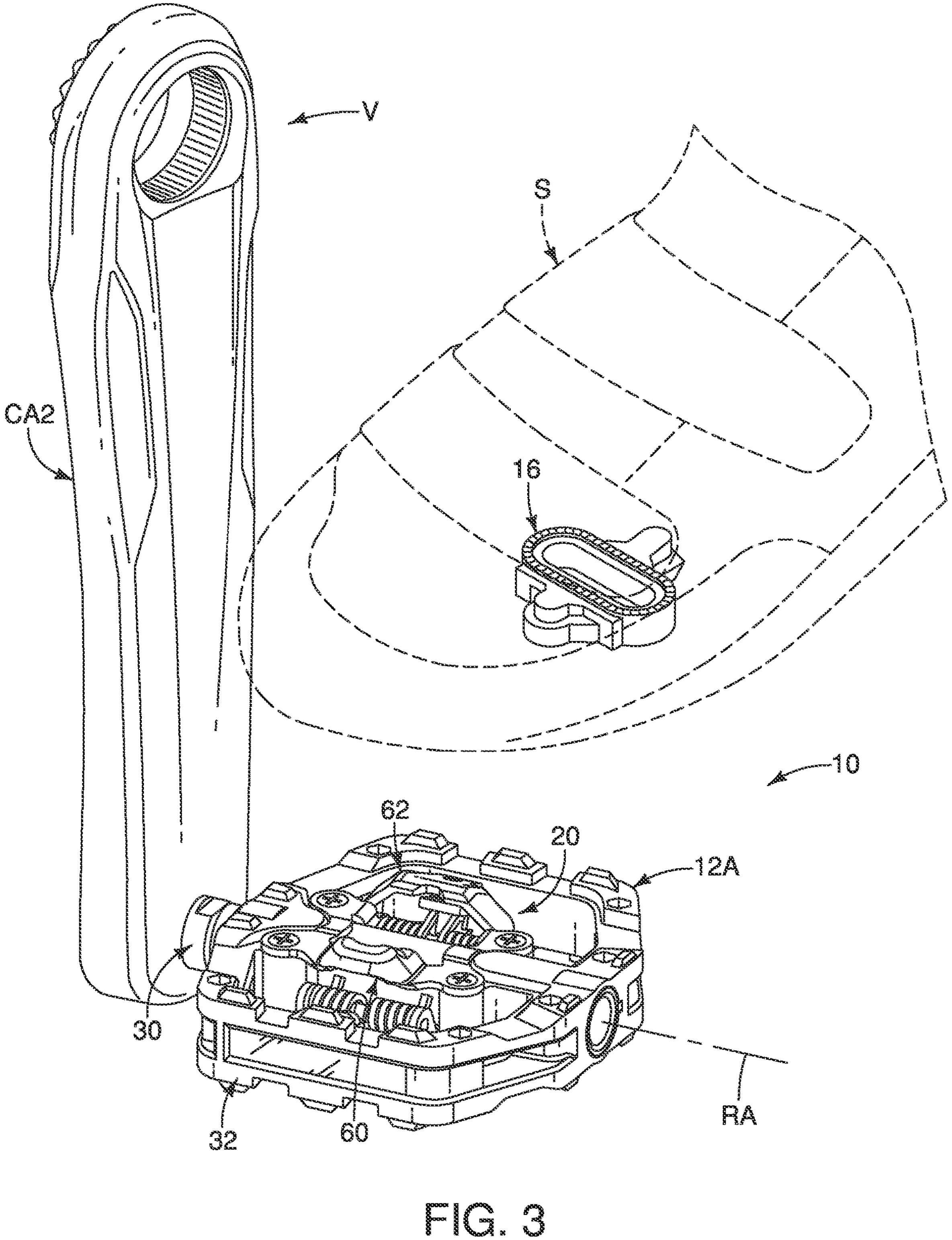
FIG. 3 is a perspective view of the pedal assembly illustrated in FIG. 1 where one of the pedals is coupled to a crank arm and a cleat is coupled to a cycling shoe.

Referring now to FIG. 3, in the illustrated embodiment, the pedal 12A of the pedal assembly 10 is a left pedal. The pedal 12A is attached to the crank arm CA2 provided on the left side of the human-powered vehicle V. The pedal assembly 10 further comprises a pair of cleats 16 (only one shown). Each of the cleats 16 is attached to a bottom of a shoe S in a conventional manner such as using a plurality of fasteners (e.g., screws). In FIG. 3, the pedal 12A includes a coupling unit 20 provided for the pedal assembly 10. Thus, the pedal 12A is a clipless or step-in pedal that is configured to releasably secure the cleat 16 thereto using the coupling unit 20. In other words, the coupling unit 20 releasably couples the cleat 16 of the shoe S to the pedal assembly 10.

Figure 4:
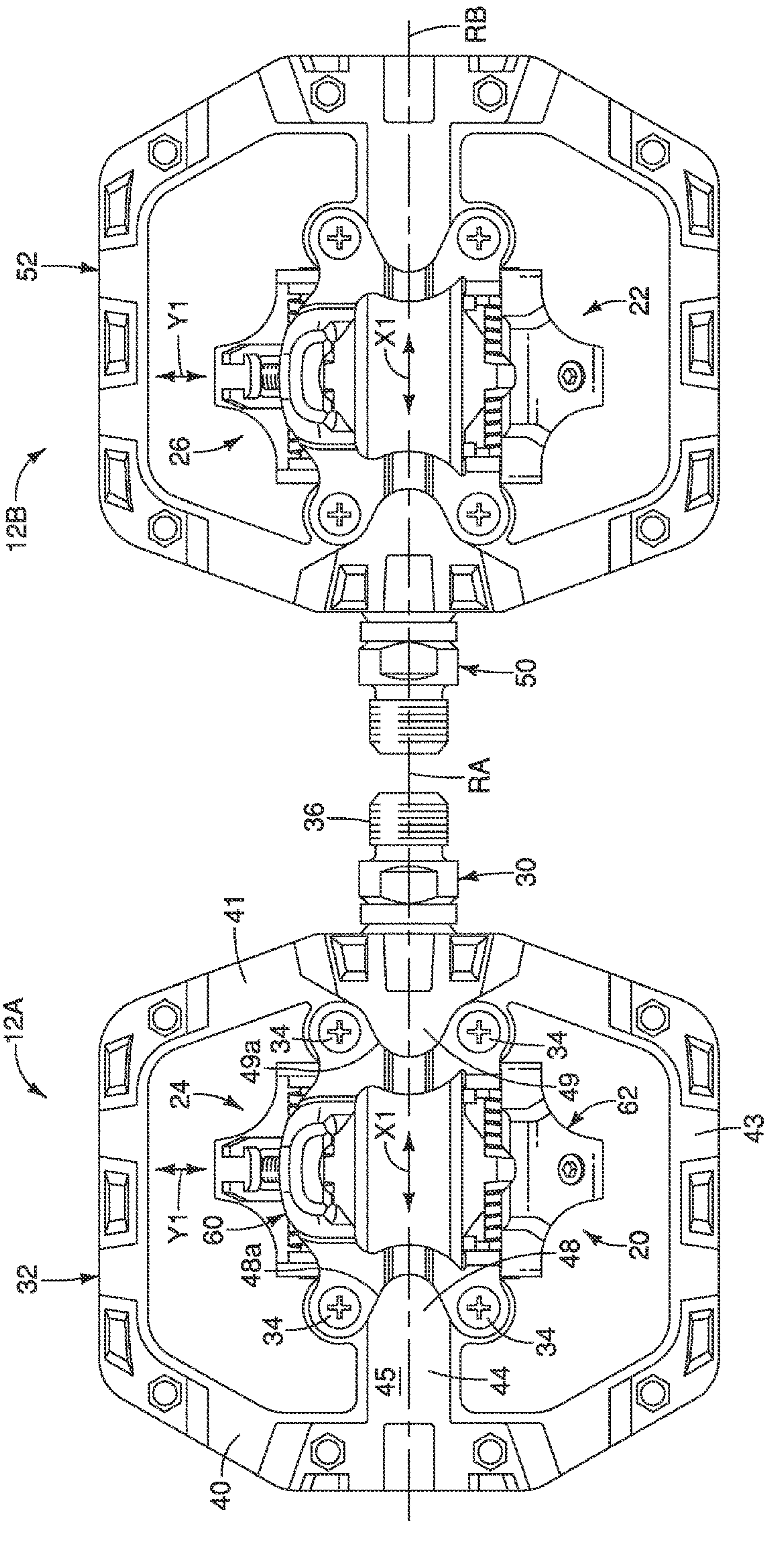
FIG. 4 is a top plan view of the pedal assembly illustrated in FIG. 1 in accordance with the first embodiment.
Figure 5:
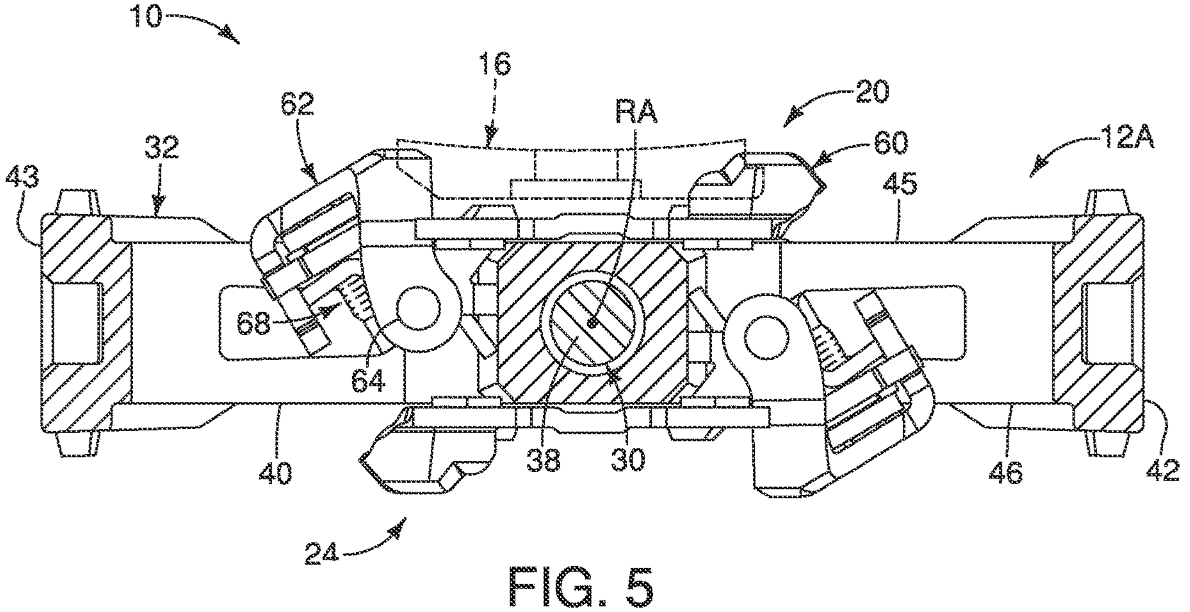
FIG. 5 is a longitudinal cross-sectional view of one of the pedals of the pedal assembly illustrated in FIG. 4 where the cleat is shown in dashed lines and the cleat is being engaged with the coupling unit where a second coupling member of the coupling unit is in a cleat holding position.
Figure 6:
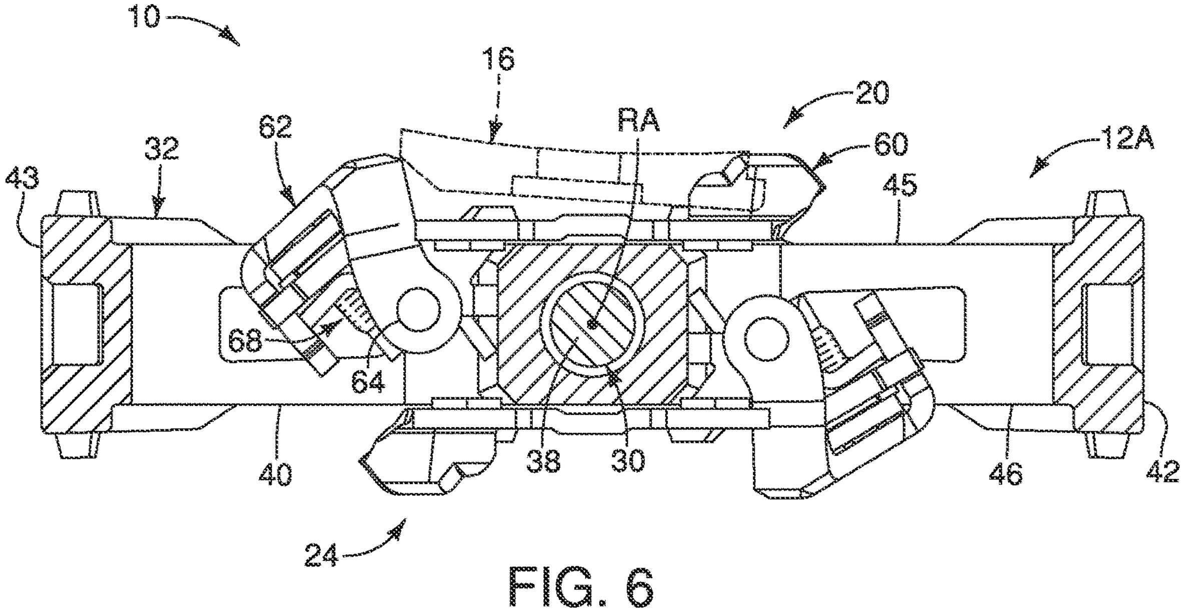
FIG. 6 is a longitudinal cross-sectional view of the pedal illustrated in FIG. 5 where the cleat is shown in dashed lines and the cleat is being disengaged from the coupling unit causing the second coupling member of the coupling unit to be pivoted from the cleat holding position shown in FIG. 5 to a cleat non-holding position.
Figure 7:
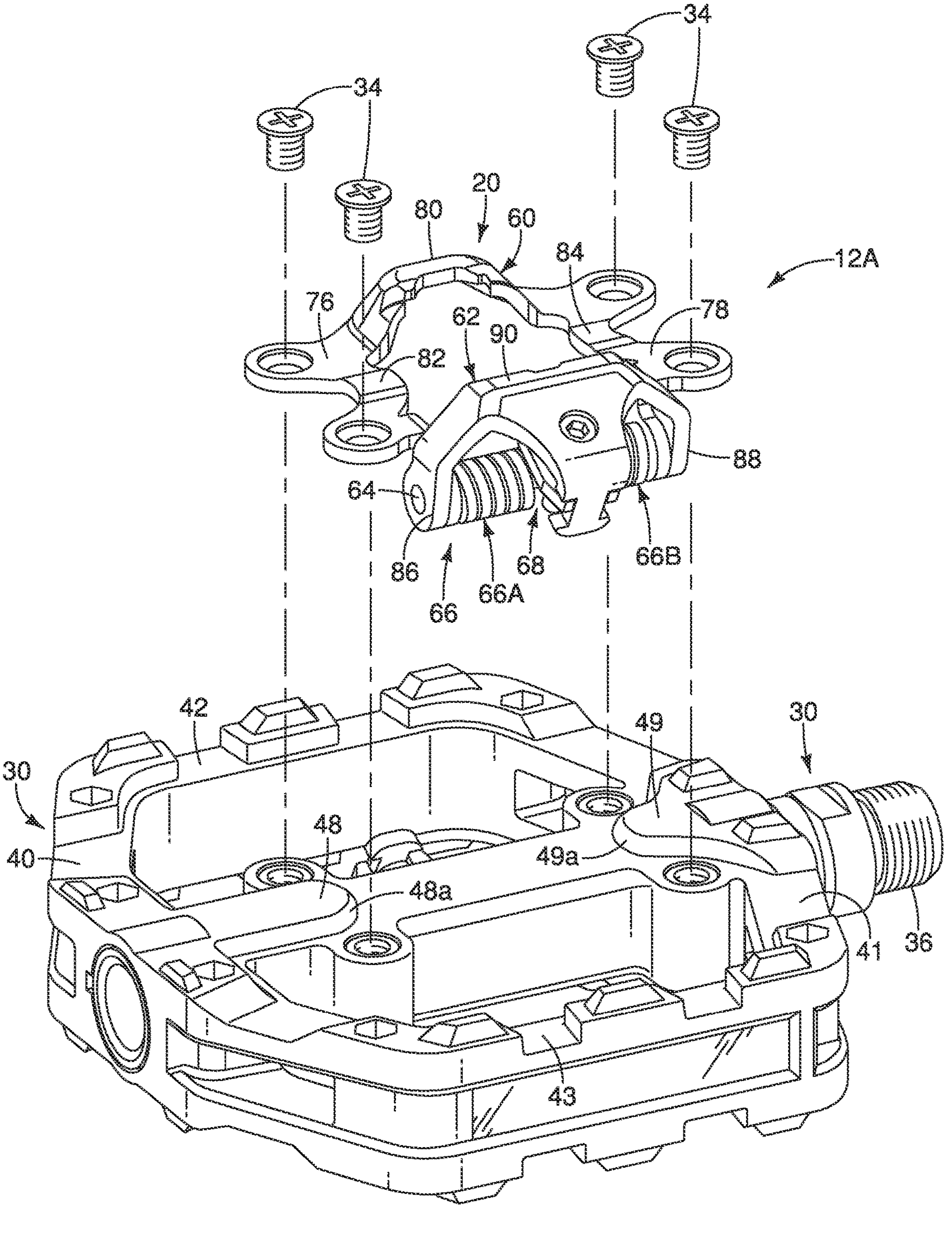
FIG. 7 is a perspective view of the pedal illustrated in FIGS. 5 and 6 where the coupling unit has been detached from the pedal body.
Figure 8:
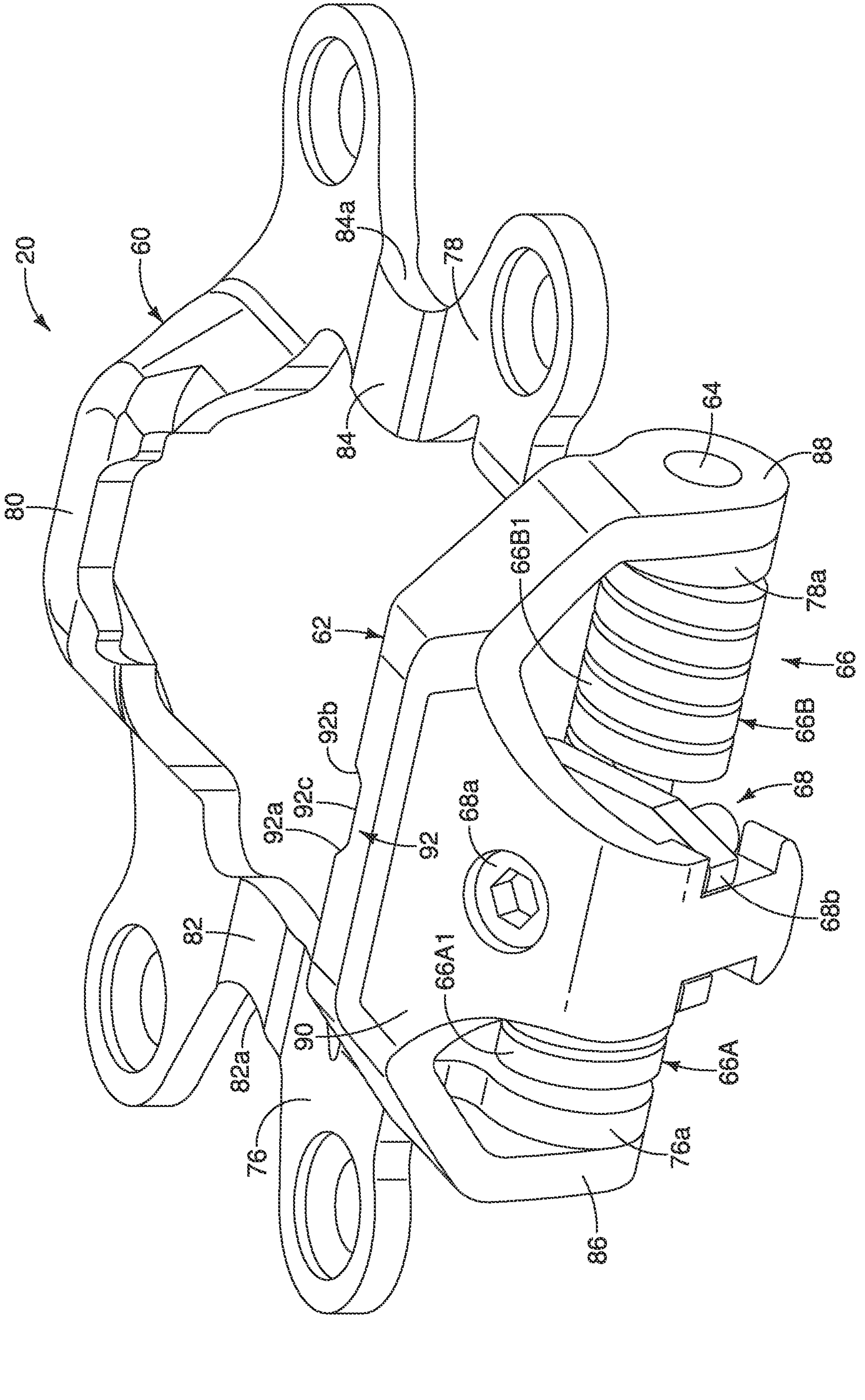
FIG. 8 is a rear perspective view of the coupling unit illustrated in FIG. 7.
Figure 9:
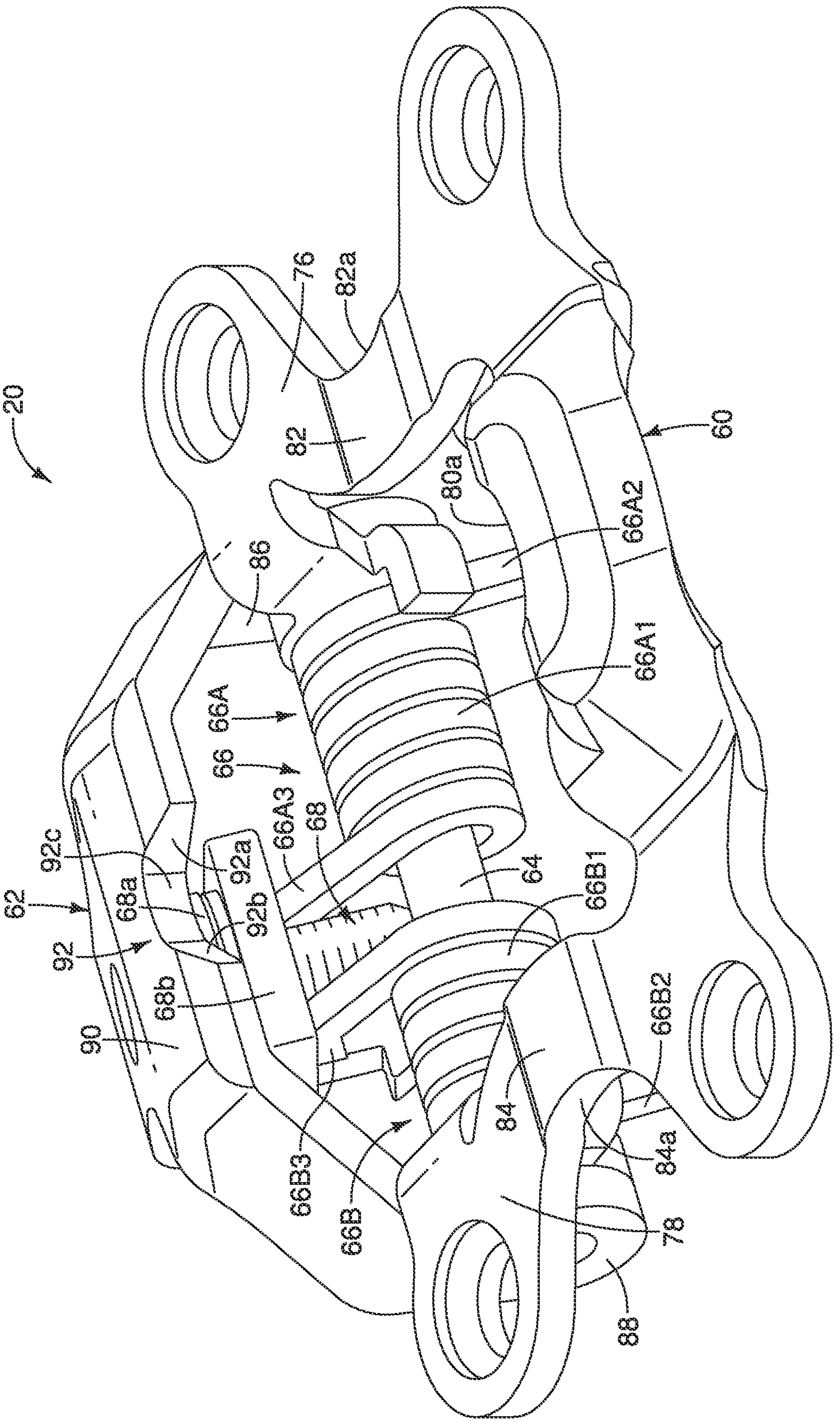
FIG. 9 is a front perspective view of the coupling unit illustrated in FIG. 8.
Figure 10:
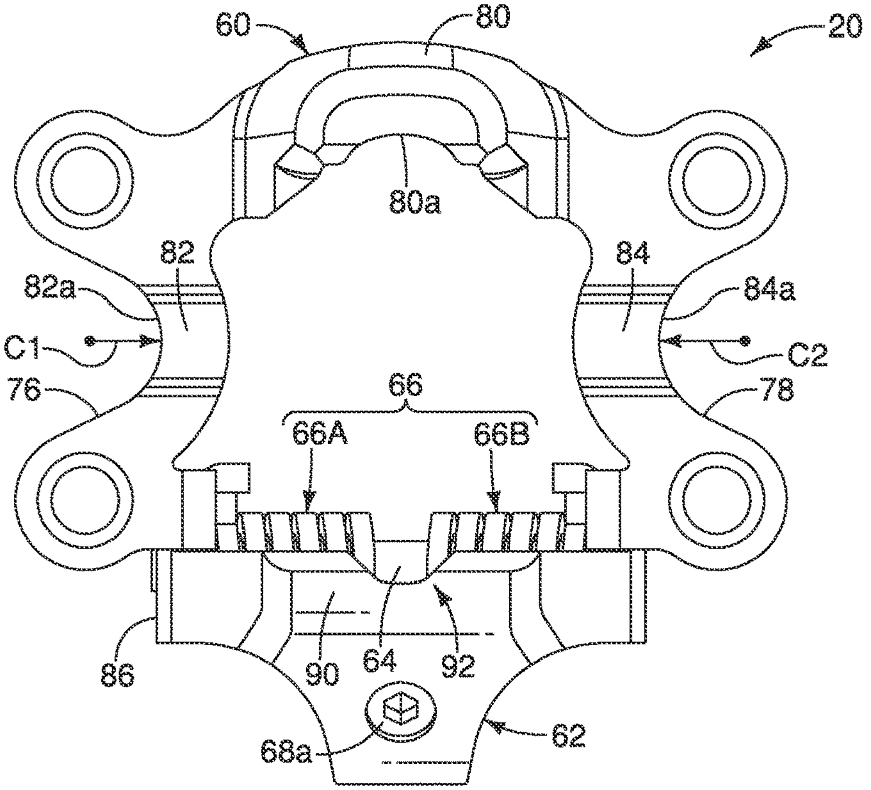
FIG. 10 is a top plan view of the coupling unit illustrated in FIGS. 7 to 9.
Figure 11:
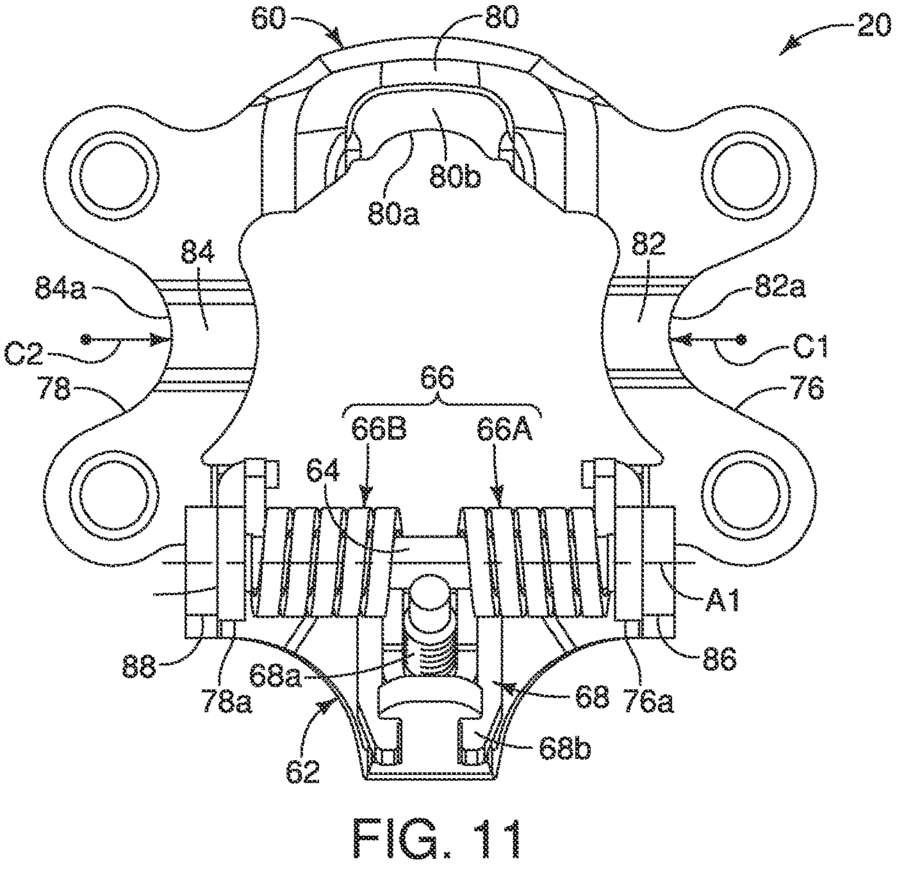
FIG. 11 is a bottom plan view of the coupling unit illustrated in FIGS. 7 to 10.
Figure 12:
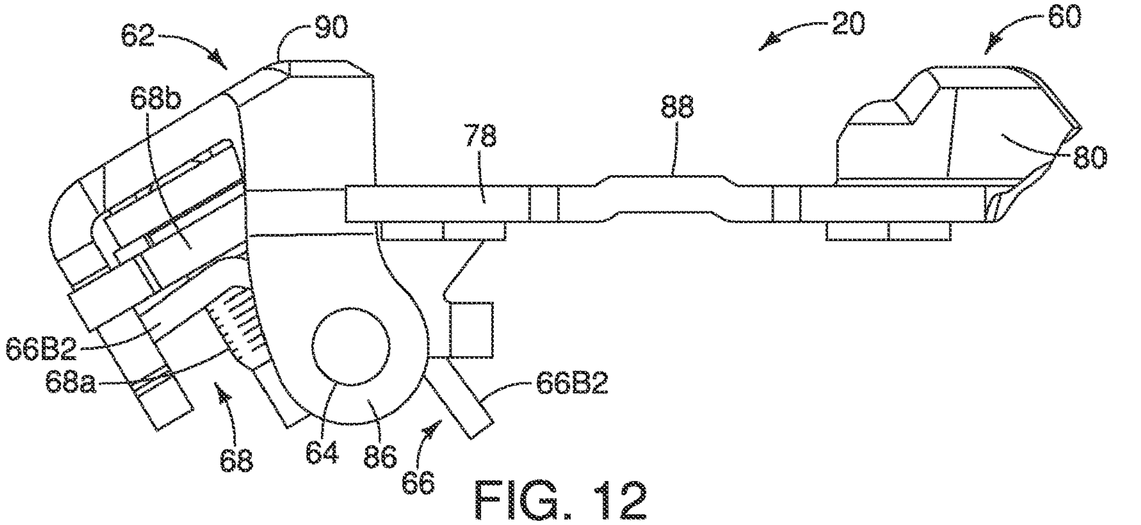
FIG. 12 is a side elevational view of the coupling unit illustrated in FIGS. 7 to 11.

Referring now to FIG. 4, the pedal assembly 10 is illustrated as including both the pedal 12A and the pedal 12B. However, the pedal assembly 10 can include only one of the pedal 12A and the pedal 12B with or without one of the cleats 16. In other words, the pedal assembly 10 comprises at least of the pedal 12A and 12B, and optionally, at least one of the cleats 16. As seen in FIGS. 4, the pedal 12B is a right pedal that includes a coupling unit 22 provided for the pedal assembly 10. Thus, the pedal 12A is a clipless or step-in pedal that is configured to releasably secure the cleat 16 thereto using the coupling unit 22. As seen in FIG. 4, the pedal 12B is a mirror image of the pedal 12A. Thus, the description of the pedal 12A applies to both a left pedal and a right pedal of the human-powered vehicle V. Thus, only one bicycle pedal is shown in the drawings and discussed below.

Here, the pedal 12A further includes an additional coupling unit 24 that is attached to an opposite side of the pedal 12A from the coupling unit 20. The additional coupling unit 24 is configured to releasably secure the cleat 16 to the pedal 12A. The coupling unit 20 and the additional coupling unit 24 are identical in construction, and thus, the description of the coupling unit 20 applies to the additional coupling unit 24.

Likewise, the pedal 12B further includes an additional coupling unit 26 that is attached to an opposite side of the pedal 12B from the coupling unit 22. The additional coupling unit 26 is configured to releasably secure the cleat 16 to the pedal 12B. The coupling unit 22 and the additional coupling unit 26 are identical in construction, and thus, the description of the coupling unit 22 applies to the additional coupling unit 26.

Accordingly, in the illustrated embodiment, the pedal 12A and the pedal 12B are double-sided step-in pedals, which means that the cleat 16 can be releasably secured to either of the two sides of the pedal 12A and the pedal 12B. Thus, the pedal 12A and the pedal 12B are especially designed for use with off-road bicycles as opposed to use with a road bicycle. However, it will be apparent to those skilled in the human-powered vehicle field from this disclosure that the construction of the pedal 12A and the pedal 12B can be modified to be a road type of bicycle pedal as needed and/or desired. In other words, it will be apparent that the pedal 12A and the pedal 12B can be designed such that the cleat 16 can only be coupled to one side of the pedal 12A and the pedal 12B.

Basically, referring to FIGS. 3 to 7, the pedal 12A comprises a pedal axle 30 and a pedal body 32. The pedal axle 30 has a rotational center axis RA. The pedal body 32 is rotatably supported with respect to the pedal axle 30 to rotate around the rotational center axis RA. The coupling unit 20 is attached to the pedal body 32. The additional coupling unit 26 is attached to the pedal body 32 by a plurality of fasteners 34 (e.g., four screws) in the same manner as the coupling unit 20. An axial direction X1 of the pedal 12A refers to a direction parallel to the rotational center axis RA. A longitudinal direction Y1 of the pedal 12A refers to a direction perpendicular to the rotational center axis RA, and parallel to a reference plane PL passing through the rotational center axis RA and bisecting the pedal body 32.

The pedal axle 30 is a rigid member that rotatably supports the pedal body 32 in a conventional manner. The pedal axle 30 is preferably made of a hard rigid material such as a metallic material or a fiber reinforced material. The pedal axle 30 has an externally threaded section 36 and a support section 38. The externally threaded section 36 includes a left-hand thread that is configured to be screwed into the crank arm CA2 on the left side of the human-powered vehicle V. The support section 38 serves to rotatably support the pedal body 32 via one or more bearings.

The pedal body 32 is a rigid member that is rotatably supported on the pedal axle 30. The pedal body 32 is preferably made of a hard rigid material such as a metallic material or a fiber reinforced material. The pedal body 32 includes an outer body portion 40, an inner body portion 41, a first body portion 42, a second body portion 43 and an intermediate body portion 44. The outer body portion 40 extends in the longitudinal direction Y1. The inner body portion 41 extends in the longitudinal direction Y1. The first body portion 42 extends in the axial direction X1. The second body portion extends in the axial direction X1. The intermediate body portion 44 is configured to receive the pedal axle 30 and extends in the axial direction X1. The intermediate body portion 44 is positioned between the outer body portion 40 and the inner body portion 41 and between the first body portion 42 and the second body portion 43. Here, the outer body portion 40, the inner body portion 41, the first body portion 42, the second body portion 43 and the intermediate body portion 44 are integrally formed as a one-piece member. Preferably, as in the illustrated embodiment, the outer body portion 40, the inner body portion 41, the first body portion 42 and the second body portion 43 are connected together to form an annular tread cage. The intermediate body portion 44 is connected to the outer body portion 40 and the inner body portion 41 to divide the pedal body 32 into a first body portion and a second body portion.

The pedal body 32 has a first shoe-disposing surface 45 and a second shoe-disposing surface 46. The second shoe-disposing surface 46 is opposite to the first shoe-disposing surface 45. The first shoe-disposing surface 45 and the second shoe-disposing surface 46 are defined by the outer body portion 40, the inner body portion 41, the first body portion 42, the second body portion 43 and the intermediate body portion 44. The coupling unit 20 is attached to the first shoe-disposing surface 45 on the intermediate body portion 44. The additional coupling unit 26 is attached to the second shoe-disposing surface 46 on the intermediate body portion 44.

Here, the intermediate body portion 44 of the pedal body 32 includes a positioning profile 48. Preferably, as in the illustrated embodiment, the intermediate body portion 44 of the pedal body 32 further includes another positioning profile 49. The positioning profile 48 and positioning profile 49 are configured to mate with the coupling unit 20. The positioning profile 48 and the positioning profile 49 are spaced apart in the axial direction X1 on the intermediate body portion 44 to form a coupling unit receiving space therebetween. The positioning profile 48 has a different profile from the positioning profile 49. For example, the positioning profile 48 has a first convex surface 48*a* and the positioning profile 49 has a second convex surface 49*a*. The first convex surface 48*a* has a smaller curvature than the second convex surface 49*a*. Preferably, as in the illustrated embodiment, both the first shoe-disposing surface 45 and the second shoe-disposing surface 46 on the intermediate body portion 44 includes the positioning profile 48 and the positioning profile 49. In this way, the coupling unit 20 and the additional coupling unit 24 can be attached to the first shoe-disposing surface 45 and the second shoe-disposing surface 46 on the intermediate body portion 44.

Referring to FIG. 4, the pedal 12B comprises a pedal axle 50 and a pedal body 52. The pedal axle 50 has a rotational center axis RB. The pedal body 52 is rotatably supported with respect to the pedal axle 50 to rotate around the rotational center axis RB. The coupling unit 22 and the additional coupling unit 26 are each detachably attached to the pedal body 52 by a plurality of fasteners (e.g., four screws). The coupling unit 22 and the additional coupling unit 26 are attached to the pedal body 52 in the same manner as the coupling unit 22. However, the coupling unit 22 and the additional coupling unit 26 are mirror images of the coupling unit 20 and the additional coupling unit 24. As a result, the coupling unit 22 and the additional coupling unit 26 cannot be coupled to the pedal body 32, and the coupling unit 20 and the additional coupling unit 24 cannot be coupled to the pedal body 52.

The pedal axle 50 is identical to the pedal axle 30, except that the pedal axle 50 includes a right-hand thread that is configured to be screwed into the crank arm CA2 on the right side of the human-powered vehicle V. Thus, for the sake of brevity, the pedal axle 50 will not be further described herein. The pedal body 52 is identical to the pedal body 32, except that the pedal body 52 is the mirror image of the pedal body 32 in the case where the pedal 12A and the pedal 12B are attached to the crank arms CA2. Thus, for the sake of brevity, the pedal body 52 will not be further described herein. In the illustrated embodiment, similar to the pedal body 32, the pedal body 52 is configured such that the coupling unit 22 is attached to a first shoe-disposing surface on an intermediate body portion of the pedal body 52 and the additional coupling unit 26 is attached to a second shoe-disposing surface on the intermediate body portion of the pedal body 52.

Now, the coupling unit 20 will be described in further detail with reference to FIGS. 7 to 14. The coupling unit 20 basically comprises a first coupling member 60, a second coupling member 62 and a shaft 64. The first coupling member 60 is configured to be disposed to the pedal body 32 of the pedal assembly 10. The second coupling member 62 is coupled to the first coupling member 60. The first coupling member 60 is configured to releasably couple the cleat 16 to the coupling unit 20. The second coupling member 62 is configured to releasably couple the cleat 16 to the coupling unit 20. The second coupling member 62 is pivotable between a cleat holding position and a cleat non-holding position.

Here, in the illustrated embodiment, the coupling unit 20 further comprises a biasing member 66. The coupling unit 20 further comprises a biasing force adjuster 68 disposed between the biasing member 66 and the second coupling member 62. The biasing member 66 biases the second coupling member 62 towards the cleat holding position. The biasing force adjuster 68 adjusts the biasing force applied to the second coupling member 62 by the biasing member 66. The biasing member 66 is disposed on the shaft 64. In the illustrated embodiment, the biasing member 66 includes a plurality of springs 66A and 66B. The springs 66A and 66B are operatively disposed between the first coupling member 60 and the second coupling member 62. Each of the plurality of springs includes a coil portion disposed on the shaft 64.

Specifically, the spring 66A includes a coil portion 66A1 disposed on the shaft 64, a first leg portion 64A2 extending from one end of the coil portion 66A1, and a second leg portion 64A3 extending from the other end of the coil portion 66A1. The first leg portion 64A2 contacts the first coupling member 60. The second leg portion 64A3 contacts the biasing force adjuster 68. Similarly, the spring 66B includes a coil portion 66B1 disposed on the shaft 64, a first leg portion 64B2 extending from one end of the coil portion 66B1, and a second leg portion 64B3 extending from the other end of the coil portion 66B1. The first leg portion 64B2 contacts the first coupling member 60. The second leg portion 64B3 contacts the biasing force adjuster 68.

The biasing force adjuster 68 basically includes an adjustment screw 68*a* and an adjustment nut 68*b*. The adjustment screw 68*a* has a head portion that is engaged in an opening of the second coupling member 62 and a threaded shaft that is threadedly engaged with the adjustment nut 68*b*. The second leg portions 64A3 and 64B3 contact the adjustment nut 68*b*. By rotating the adjustment screw 68*a*, the adjustment nut 68*b* moves along the threaded shaft of the adjustment screw 68*a* to either increase or decrease the biasing force applied to the second coupling member 62 by the springs 66A and 66B. Since biasing force adjusters are well known in pedals, the biasing force adjuster 68 will not be described in further detail herein.

Figure 13:
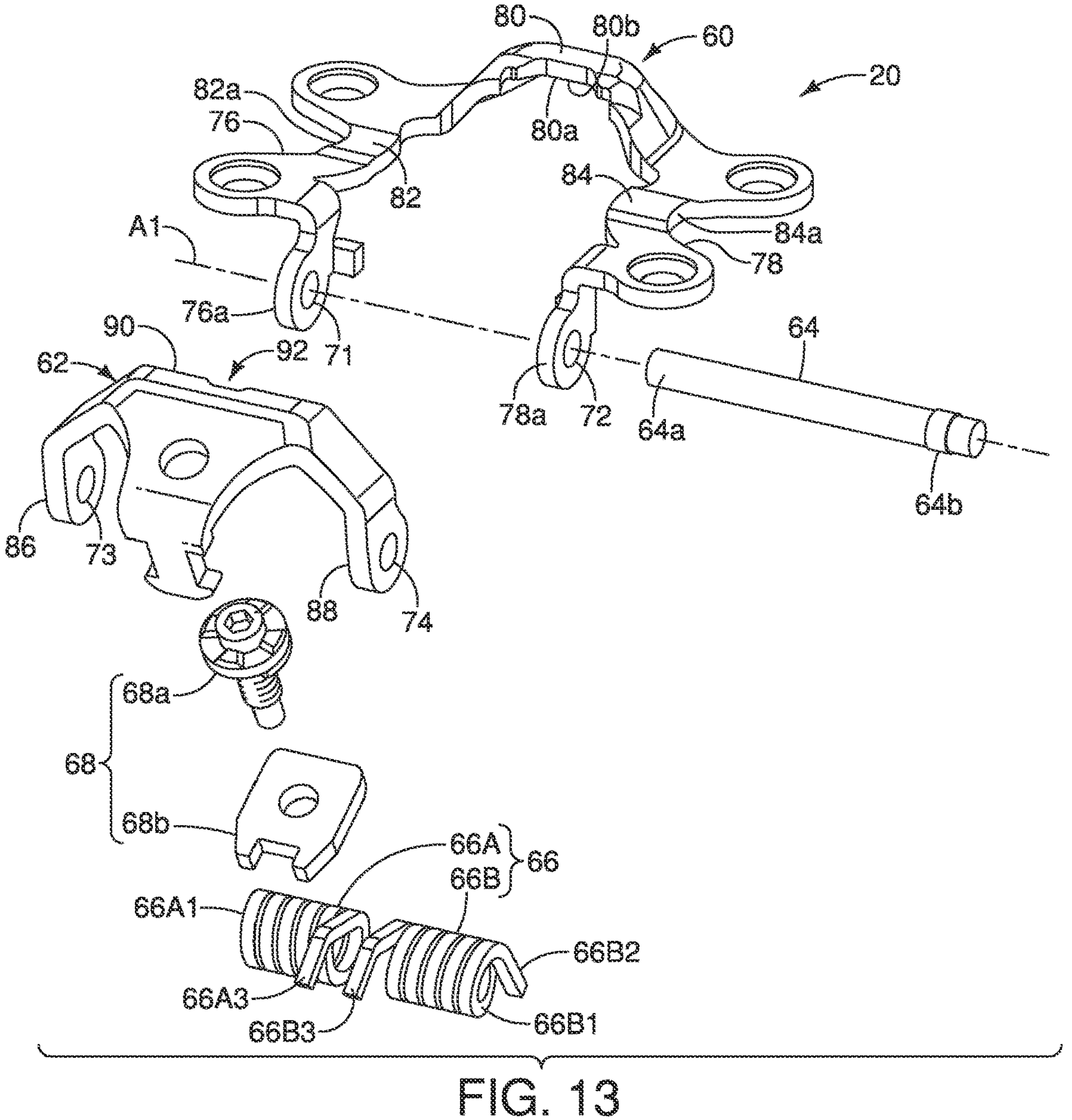
FIG. 13 is an exploded perspective view of the coupling unit illustrated in FIGS. 7 to 12.
Figure 14:
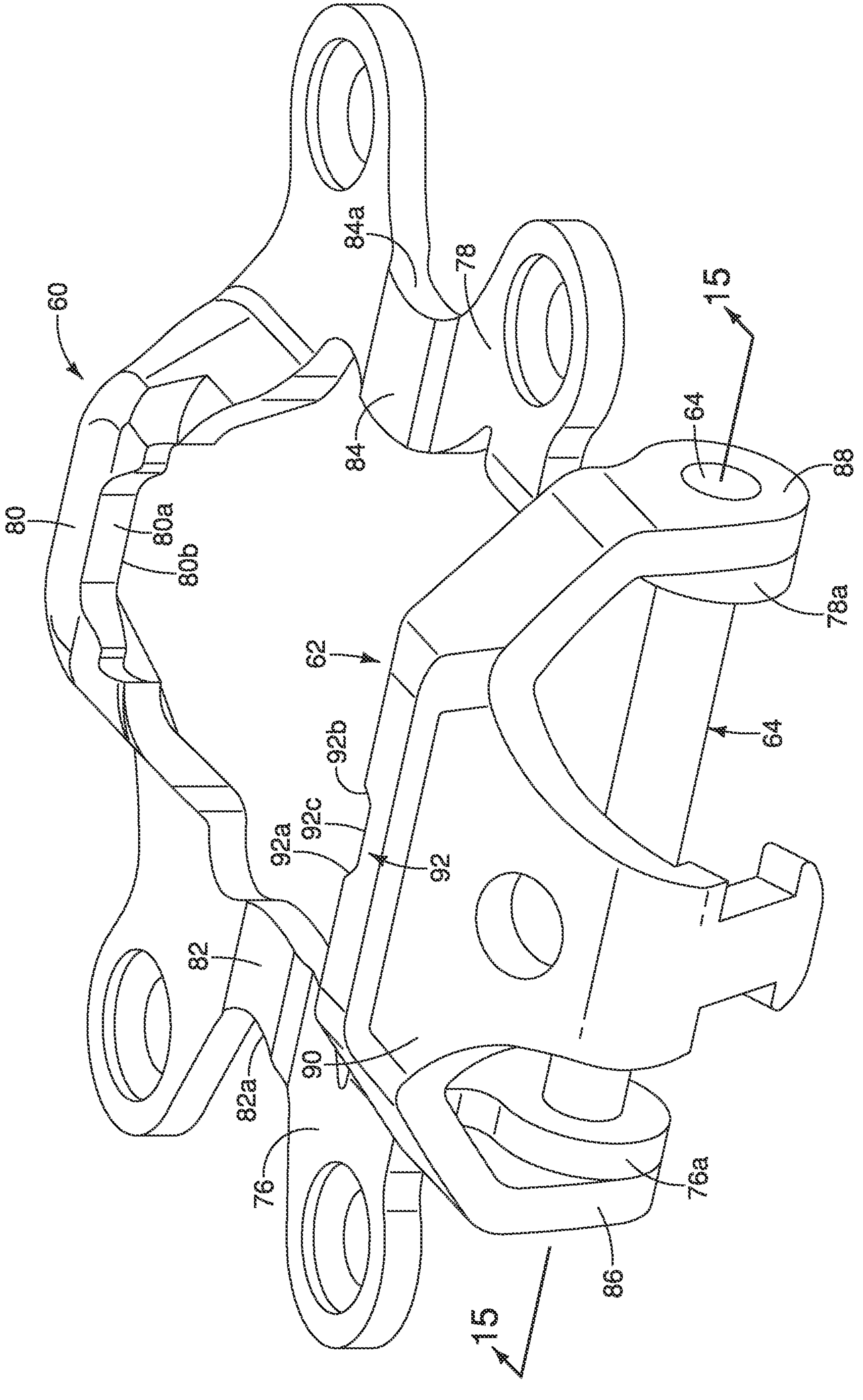
FIG. 14 is a rear perspective view of a first coupling member, a second coupling member and a shaft of the coupling unit illustrated in FIGS. 7 to 13.
Figure 15:
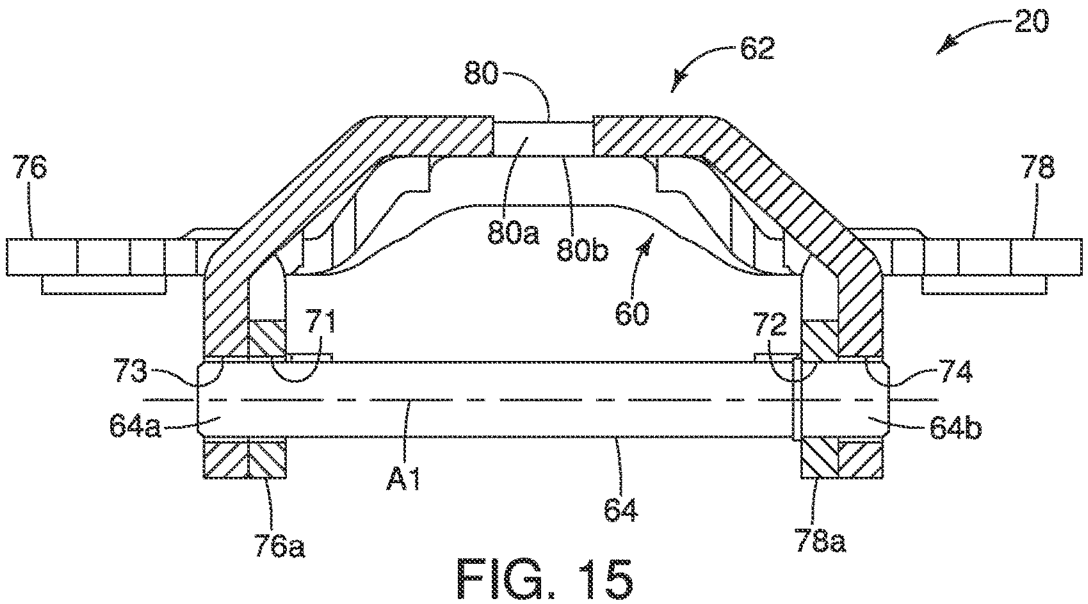
FIG. 15 is a cross-sectional view of the first coupling member, the second coupling member and the shaft of the coupling unit illustrated in FIGS. 7 to 14 as seen along section line 15-15 of FIG. 14.
Figure 16:
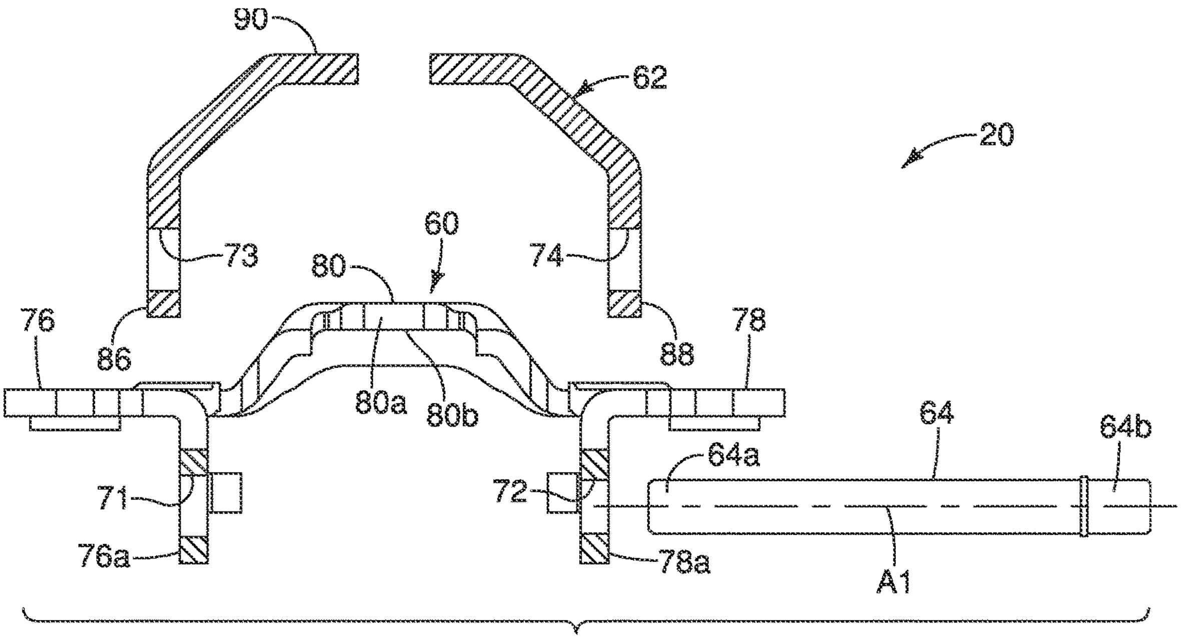
FIG. 16 is an exploded cross-sectional view of the first coupling member, the second coupling member and the shaft illustrated in FIG. 15.

As seen in FIGS. 13, 15 and 16, the first coupling member 60 has a first hole 71 and a second hole 72. The second coupling member 62 has a third hole 73 and a fourth hole 74. The shaft 64 has a center axis A1. The center axis A1 defines an axial direction of the shaft 64. The shaft 64 has a first axial end 64*a* and a second axial end 64*b* opposite to the first axial end 64*a*. The shaft 64 is disposed in the first hole 71, the second hole 72, the third hole 73 and the fourth hole 74 such that the second coupling member 62 is pivotable about the center axis A1. More specifically, the first coupling member 60 includes a first pedal mounted portion 76, a second pedal mounted portion 78 and a cleat engagement portion 80. In the illustrated embodiment, the first pedal mounted portion 76 includes a first end portion 76*a* having the first hole 71. The second pedal mounted portion 78 includes a second end portion 78*a* having a second hole 72. The shaft 64 is disposed in the first hole 71 and the second hole 71.

The cleat engagement portion 80 connects the first pedal mounted portion 76 and the second pedal mounted portion 78. The cleat engagement portion 80 is configured to engage a front end of the cleat 16. Specifically, the cleat engagement portion 80 has an abutment surface 80*a* and a retaining surface 80*b*. The abutment surface 80*a* is a concave surface that restricts forward movement of the cleat 16 with respect to the pedal body 32. The retaining surface 80*b* is an underside surface that contacts a front end surface of the cleat 16 to restrict movement of the cleat 16 away from the pedal body 32.

Also, the first coupling member 60 includes an outer portion 82 and an inner portion 84. Both of the outer portion 82 and the inner portion 84 curve toward each other. Here, a curvature of outer portion 82 is different from a curvature of the inner portion 84. In particular, the outer portion 82 includes an outer engagement recess 82*a* that is configured to engage with the positioning profile 48 of the pedal body 32. The inner portion 84 includes an inner engagement recess 84*a* configured to engage with another positioning profile 49 of the pedal body 32. The inner engagement recess 82*a* is different from the outer engagement recess in shape.

The second coupling member 62 is pivotable about the center axis A1 of the shaft 64. Basically, the second coupling member 62 includes the third hole 73 and the fourth hole 74. The shaft 64 is disposed in the third hole 73 and the fourth hole 74. More specifically, the second coupling member 62 includes a first pedal mounted portion 86, a second pedal mounted portion 88 and a cleat engagement portion 90. The cleat engagement portion 80 is configured to engage a rear end of the cleat 16. Specifically, the cleat engagement portion 90 of the second coupling member 62 includes a concave portion 92. The concave portion 92 is configured to abut against the cleat 16 at least during transitioning between the cleat holding position and the cleat non-holding position. Here, the concave portion 92 defines an abutment surface that restricts rearward movement of the cleat 16 with respect to the pedal body 32. In particular, the concave portion 92 has a first linear portion 92*a*, a second linear portion 92*b* and an intermediate portion 92*c*. The intermediate portion 92*c* connects the first linear portion 92*a* and the second linear portion 92*b*. Basically, the first linear portion 92*a*, the second linear portion 92*b* and the intermediate portion 92*c* define a concave surface. The cleat engagement portion 90 of the second coupling member 62 further includes a retaining surface 94 that is an underside surface that contacts a rear end surface of the cleat 16 to restrict movement of the cleat 16 away from the pedal body 32.

Referring now to FIG. 15, the shaft 64 is preferably non-rotatably coupled to either the first coupling member 60 or the second coupling member 62. For example, the shaft 64 is press-fitted to at least one of the first hole 71, the second hole 72, the third hole 73 and the fourth hole 74. In the first embodiment, the shaft 64 is press-fitted to the second hole 72 such that the shaft 64 is non-rotatably coupled to the first coupling member 60. In the first embodiment, the shaft 64 is loose-fitted to the first hole 71, the third hole 73 and the fourth hole 74. As a result, the second coupling member 62 can pivot on the shaft 64. Also, in the first embodiment, the first hole 71 is disposed adjacent to the third hole 73 with respect to the axial direction defined by the center axis A1 of the shaft 64. The second hole 72 is adjacent to the fourth hole 74 with respect to the axial direction. In particular, the first pedal mounted portion 76 and the second pedal mounted portion 78 are located between the first pedal mounted portion 86 and the second pedal mounted portion 88. Thus, the first hole 71 and the second hole 72 are located between the third hole 73 and the fourth hole 74. Alternatively, the first pedal mounted portion 86 and the second pedal mounted portion 88 can be located between the first pedal mounted portion 76 and the second pedal mounted portion 78. In this alternative, the third hole 73 and the fourth hole 74 can be located between the first hole 71 and the second hole 72. Of course, arrangements of the first pedal mounted portion 76, the second pedal mounted portion 78, the first pedal mounted portion 86 and the second pedal mounted portion 88 are also possible as needed and/or desired.

However, the connection between the shaft 64 and the first coupling member 60 and the second coupling member 62 can be accomplished in serval ways. Specifically, as in the first embodiment, the shaft 64 is press-fitted to the second hole 72 in a case where the shaft 64 is loose-fitted to the first hole 71, the third hole 73 and the fourth hole 74.

Figure 17:
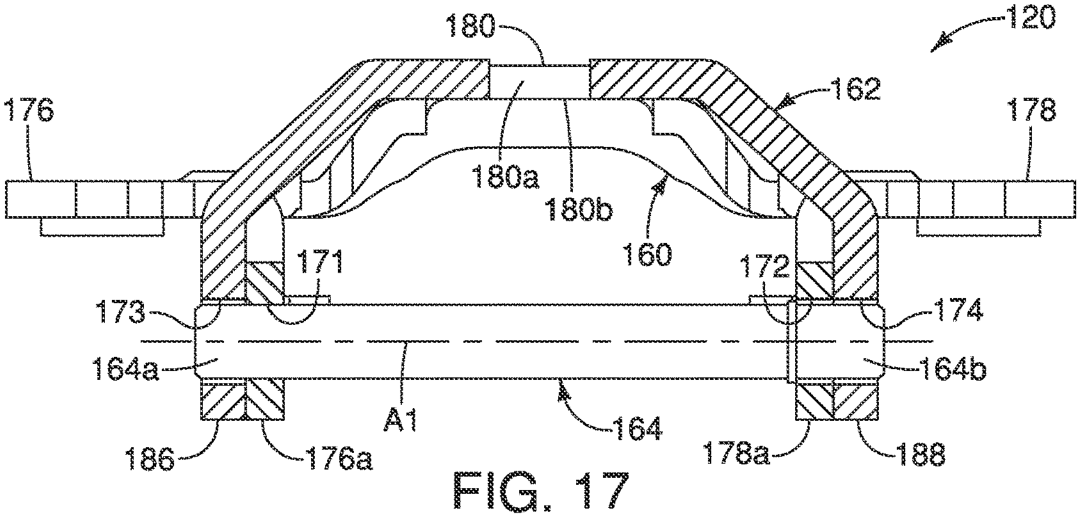
FIG. 17 is a cross-sectional view, similar to FIG. 15, a first coupling member, a second coupling member and a shaft for a coupling unit in accordance with a first modification.

Referring now to FIG. 17, a coupling unit 120 is illustrated in accordance with a first modification. The coupling unit 120 basically includes a first coupling member 160, the second coupling member 162 and a shaft 164. The first coupling member 160 is identical to the first coupling member 60, discussed above, except that for the connection of the shaft 164 to the first coupling member 160 and the second coupling member 162 is different from the first embodiment. Thus, the parts of the coupling unit 120 that are identical to the parts of the coupling unit 20 will not be described or illustrated herein for the sake of brevity.

The first coupling member 160 has a first hole 171 and a second hole 172. The second coupling member 162 has a third hole 173 and a fourth hole 174. The shaft 164 has a first axial end 164*a* and a second axial end 164*b* opposite to the first axial end 164*a*. The shaft 164 is disposed in the first hole 171, the second hole 172, the third hole 173 and the fourth hole 174 such that the second coupling member 162 is pivotable about the center axis A1. More specifically, the first coupling member 160 includes a first pedal mounted portion 176, a second pedal mounted portion 178 and a cleat engagement portion 180. The first pedal mounted portion 176 includes a first end portion 176*a* having the first hole 171. The second pedal mounted portion 178 includes a second end portion 178*a* having the second hole 172. The cleat engagement portion 180 is configured to engage a front end of the cleat 16. Specifically, the cleat engagement portion 180 has an abutment surface 180*a* and a retaining surface 180*b* similar to the cleat engagement portion 80. Here, the first coupling member 160 is identical to the first coupling member 60, except that the size of the first hole 171 and the size of the second hole 172 have been changed, as explained below.

Here, the second coupling member 162 is identical to the second coupling member 62. Similar to the second coupling member 62, the second coupling member 162 includes a first pedal mounted portion 186 having the third hole 173, a second pedal mounted portion 188 having the fourth hole 174, and a cleat engagement portion 190.

In the first modification, the shaft 164 is press-fitted to the first hole 171 such that the shaft 164 is non-rotatably coupled to the first coupling member 160. In the first modification, the shaft 164 is loose-fitted to the second hole 172, the third hole 173 and the fourth hole 174. As a result, the second coupling member 162 can pivot on the shaft 164. Of course, the shaft 164 can be press-fitted to the second hole 172. Accordingly, the shaft 164 is press-fitted to the first hole 171 in a case where the shaft 164 is press-fitted to the second hole 172 or in a case where the shaft 164 is loose-fitted to the second hole 172, the third hole 173 and the fourth hole 174.

Figure 18:
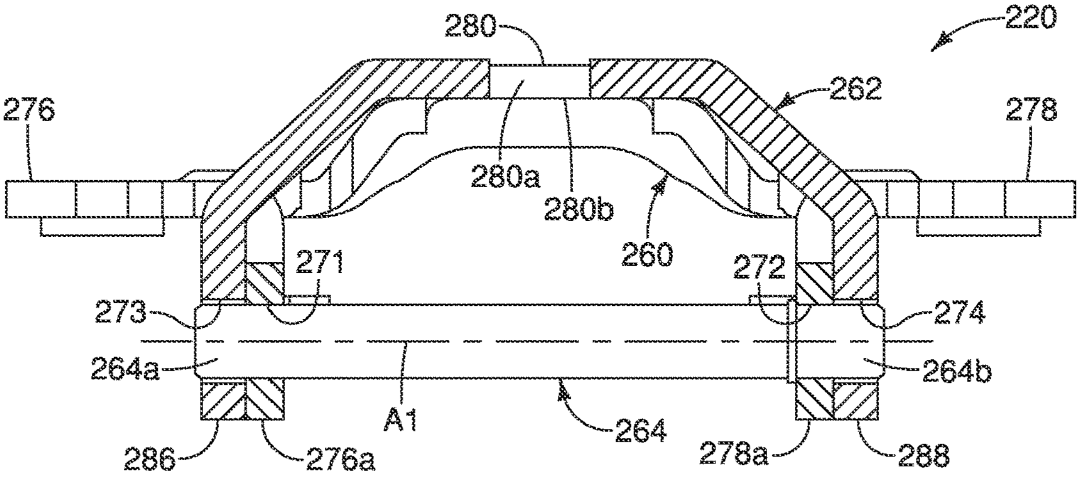
FIG. 18 is a cross-sectional view, similar to FIGS. 15 and 17, a first coupling member, a second coupling member and a shaft for a coupling unit in accordance with a second modification.

Referring now to FIG. 18, a coupling unit 220 is illustrated in accordance with a second modification. The coupling unit 220 basically includes a first coupling member 260, the second coupling member 262 and a shaft 264. The first coupling member 260 is identical to the first coupling member 60, discussed above, except that for the connection of the shaft 264 to the first coupling member 260 and the second coupling member 262 is different from the first embodiment. Thus, the parts of the coupling unit 220 that are identical to the parts of the coupling unit 20 will not be described or illustrated herein for the sake of brevity.

The first coupling member 260 has a first hole 271 and a second hole 272. The second coupling member 262 has a third hole 273 and a fourth hole 274. The shaft 264 has a first axial end 264*a* and a second axial end 264*b* opposite to the first axial end 264*a*. The shaft 264 is disposed in the first hole 271, the second hole 272, the third hole 273 and the fourth hole 274 such that the second coupling member 262 is pivotable about the center axis A1. More specifically, the first coupling member 260 includes a first pedal mounted portion 276, a second pedal mounted portion 278 and a cleat engagement portion 280. The first pedal mounted portion 276 includes a first end portion 276*a* having the first hole 271. The second pedal mounted portion 278 includes a second end portion 278*a* having the second hole 272. The cleat engagement portion 280 is configured to engage a front end of the cleat 16. Specifically, the cleat engagement portion 280 has an abutment surface 280*a* and a retaining surface 280*b* similar to the cleat engagement portion 80. Here, the first coupling member 260 is identical to the first coupling member 60, except that the size of the first hole 271 has been changed, as explained below.

Here, the second coupling member 262 is identical to the second coupling member 62. Similar to the second coupling member 62, the second coupling member 262 includes a first pedal mounted portion 286 having the third hole 273, a second pedal mounted portion 288 having the fourth hole 274, and a cleat engagement portion 290.

In the second modification, the shaft 264 is press-fitted to the first hole 271 and the second hole 272 such that the shaft 264 is non-rotatably coupled to the first coupling member 260. In the second modification, the shaft 264 is loose-fitted to the third hole 273 and the fourth hole 274. As a result, the second coupling member 262 can pivot on the shaft 264. Accordingly, the shaft 264 is press-fitted to the first hole 271 in a case where the shaft 264 is press-fitted to the second hole 272 (the second modification of FIG. 18) or in a case where the shaft is loose-fitted to the second hole, the third hole and the fourth hole (the first modification of FIG. 17).

Figure 19:
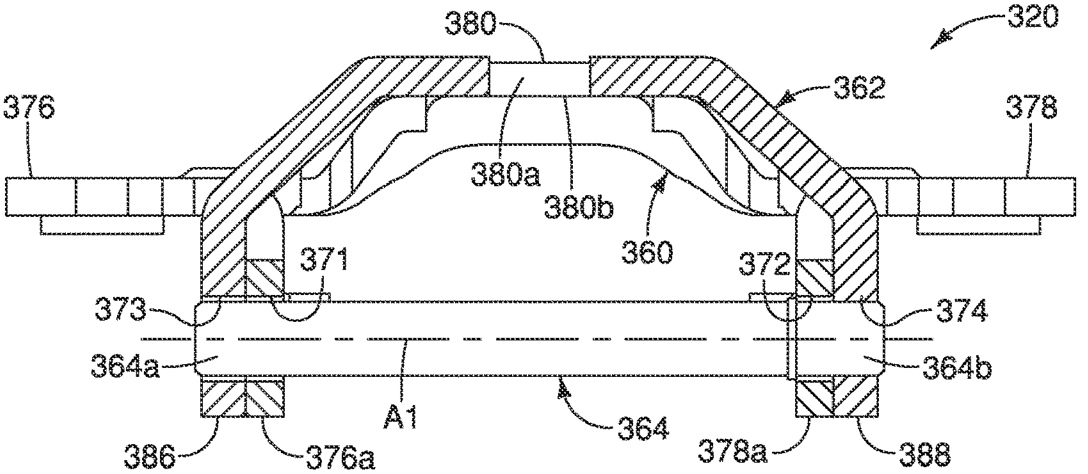
FIG. 19 is a cross-sectional view, similar to FIGS. 15, 17 and 18, a first coupling member, a second coupling member and a shaft for a coupling unit in accordance with a third modification.

Referring now to FIG. 19, a coupling unit 320 is illustrated in accordance with a third modification. The coupling unit 320 basically includes a first coupling member 360, the second coupling member 362 and a shaft 364. The first coupling member 360 is identical to the first coupling member 60, discussed above, except that for the connection of the shaft 364 to the first coupling member 360 and the second coupling member 362 is different from the first embodiment. Thus, the parts of the coupling unit 320 that are identical to the parts of the coupling unit 20 will not be described or illustrated herein for the sake of brevity.

The first coupling member 360 has a first hole 371 and a second hole 372. The second coupling member 362 has a third hole 373 and a fourth hole 374. The shaft 364 has a first axial end 364*a* and a second axial end 364*b* opposite to the first axial end 364*a*. The shaft 364 is disposed in the first hole 371, the second hole 372, the third hole 373 and the fourth hole 374 such that the second coupling member 362 is pivotable about the center axis A1. More specifically, the first coupling member 360 includes a first pedal mounted portion 376, a second pedal mounted portion 378 and a cleat engagement portion 380. The first pedal mounted portion 376 includes a first end portion 376*a* having the first hole 371. The second pedal mounted portion 378 includes a second end portion 378*a* having the second hole 372. The cleat engagement portion 380 is configured to engage a front end of the cleat 16. Specifically, the cleat engagement portion 380 has an abutment surface 380*a* and a retaining surface 380*b* similar to the cleat engagement portion 80. Here, the first coupling member 360 is identical to the first coupling member 60, except that the size of the first hole 371 and the size of the second hole 372 have been changed, as explained below.

Here, the second coupling member 362 is identical to the second coupling member 62, except that the size of the fourth hole 374 has been changed, as explained below. Similar to the second coupling member 62, the second coupling member 362 includes a first pedal mounted portion

386 having the third hole 373, a second pedal mounted portion 388 having the fourth hole 374, and a cleat engagement portion 390.

In the third modification, the shaft 364 is press-fitted to the fourth hole 374 such that the shaft 364 is non-rotatably coupled to the second member 362. In the third modification, the shaft 364 is loose-fitted to the first hole 371, the second hole 372 and the third hole 373. As a result, the second coupling member 362 can pivot on the shaft 364. Accordingly, the shaft 364 is press-fitted to the fourth hole 374 in a case where the shaft 364 is loose-fitted to the first hole 371, the second hole 372 and the third hole 373.

Figure 20:
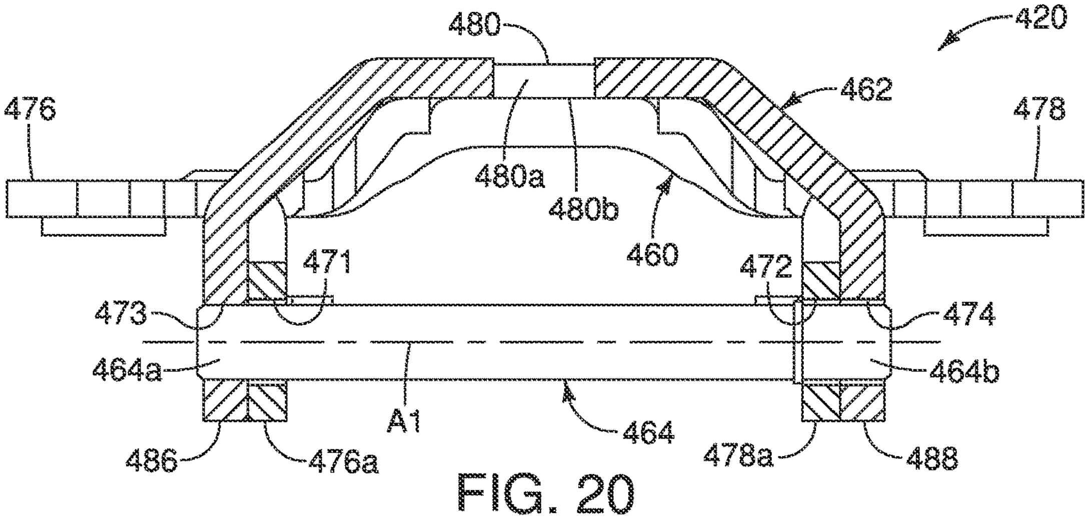
FIG. 20 is a cross-sectional view, similar to FIGS. 15 and 17 to 19, a first coupling member, a second coupling member and a shaft for a coupling unit in accordance with a fourth modification.

Referring now to FIG. 20, a coupling unit 420 is illustrated in accordance with a fourth modification. The coupling unit 420 basically includes a first coupling member 460, the second coupling member 462 and a shaft 464. The first coupling member 460 is identical to the first coupling member 60, discussed above, except that for the connection of the shaft 464 to the first coupling member 460 and the second coupling member 462 is different from the first embodiment. Thus, the parts of the coupling unit 420 that are identical to the parts of the coupling unit 20 will not be described or illustrated herein for the sake of brevity.

The first coupling member 460 has a first hole 471 and a second hole 472. The second coupling member 462 has a third hole 473 and a fourth hole 474. The shaft 464 has a first axial end 464*a* and a second axial end 464*b* opposite to the first axial end 464*a*. The shaft 464 is disposed in the first hole 471, the second hole 472, the third hole 473 and the fourth hole 474 such that the second coupling member 462 is pivotable about the center axis A1. More specifically, the first coupling member 460 includes a first pedal mounted portion 476, a second pedal mounted portion 478 and a cleat engagement portion 480. The first pedal mounted portion 476 includes a first end portion 476*a* having the first hole 471. The second pedal mounted portion 478 includes a second end portion 478*a* having the second hole 472. The cleat engagement portion 480 is configured to engage a front end of the cleat 16. Specifically, the cleat engagement portion 480 has an abutment surface 480*a* and a retaining surface 480*b* similar to the cleat engagement portion 80. Here, the first coupling member 460 is identical to the first coupling member 60, except the size of the second hole 472 have been changed, as explained below.

Here, the second coupling member 462 is identical to the second coupling member 62, except that the size of the third hole 473 has been changed, as explained below. Similar to the second coupling member 62, the second coupling member 462 includes a first pedal mounted portion 486 having the third hole 473, a second pedal mounted portion 488 having the fourth hole 474, and a cleat engagement portion 490.

In the fourth modification, the shaft 464 is press-fitted to the third hole 473 such that the shaft 464 is non-rotatably coupled to the second member 462. In the fourth modification, the shaft 464 is loose-fitted to the first hole 471, the second hole 472 and the fourth hole 474. As a result, the second coupling member 462 can pivot on the shaft 464. Accordingly, the shaft 464 is press-fitted to the third hole 473 in a case where the shaft 464 is press-fitted to the fourth hole 474 or in a case where the shaft 464 is loose-fitted to the first hole 471, the second hole 472 and the fourth hole 474.

Figure 21:
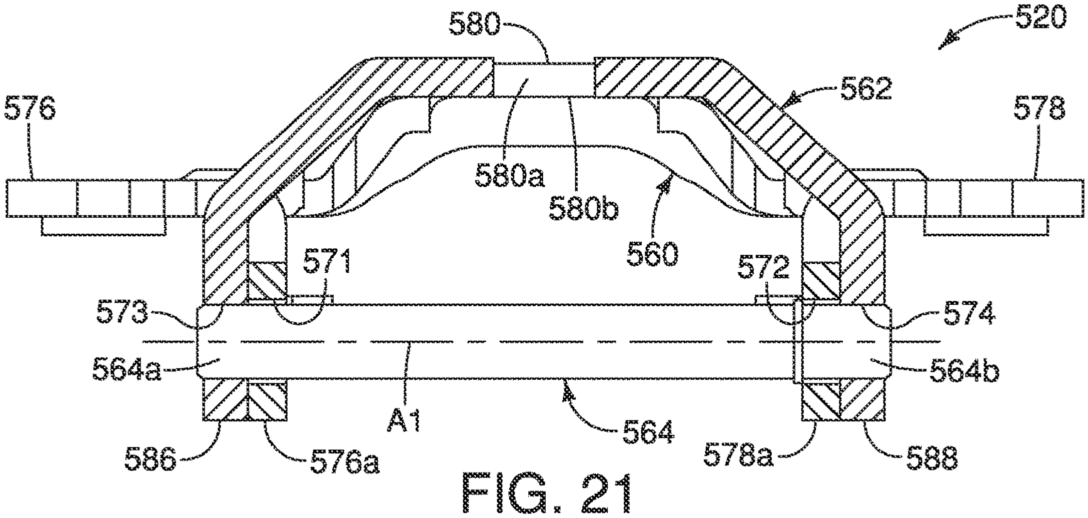
FIG. 21 is a cross-sectional view, similar to FIGS. 15 and 17 to 20, a first coupling member, a second coupling member and a shaft for a coupling unit in accordance with a fifth modification.

Referring now to FIG. 21, a coupling unit 520 is illustrated in accordance with a fifth modification. The coupling unit 520 basically includes a first coupling member 560, the second coupling member 562 and a shaft 564. The first coupling member 560 is identical to the first coupling member 60, discussed above, except that for the connection of the shaft 564 to the first coupling member 560 and the second coupling member 562 is different from the first embodiment. Thus, the parts of the coupling unit 520 that are identical to the parts of the coupling unit 20 will not be described or illustrated herein for the sake of brevity.

The first coupling member 560 has a first hole 571 and a second hole 572. The second coupling member 562 has a third hole 573 and a fourth hole 574. The shaft 564 has a first axial end 564*a* and a second axial end 564*b* opposite to the first axial end 564*a*. The shaft 564 is disposed in the first hole 571, the second hole 572, the third hole 573 and the fourth hole 574 such that the second coupling member 562 is pivotable about the center axis A1. More specifically, the first coupling member 560 includes a first pedal mounted portion 576, a second pedal mounted portion 578 and a cleat engagement portion 580. The first pedal mounted portion 576 includes a first end portion 576*a* having the first hole 571. The second pedal mounted portion 578 includes a second end portion 578*a* having the second hole 572. The cleat engagement portion 580 is configured to engage a front end of the cleat 16. Specifically, the cleat engagement portion 580 has an abutment surface 580*a* and a retaining surface 580*b* similar to the cleat engagement portion 80. Here, the first coupling member 560 is identical to the first coupling member 60, except that the size of the second hole 572 has been changed, as explained below.

Here, the second coupling member 562 is identical to the second coupling member 62, except that the size of the third hole 573 and the size of the fourth hole 574 have been changed, as explained below. Similar to the second coupling member 62, the second coupling member 562 includes a first pedal mounted portion 586 having the third hole 573, a second pedal mounted portion 588 having the fourth hole 574, and a cleat engagement portion 590.

In the fifth modification, the shaft 64 is press-fitted to the third hole 73 and the fourth hole 74 such that the shaft 564 is non-rotatably coupled to the second coupling member 562. In the fifth modification, the shaft 564 is loose-fitted to the first hole 571 and the second hole 572. As a result, the second coupling member 562 can pivot on the shaft 564.

Figure 22:
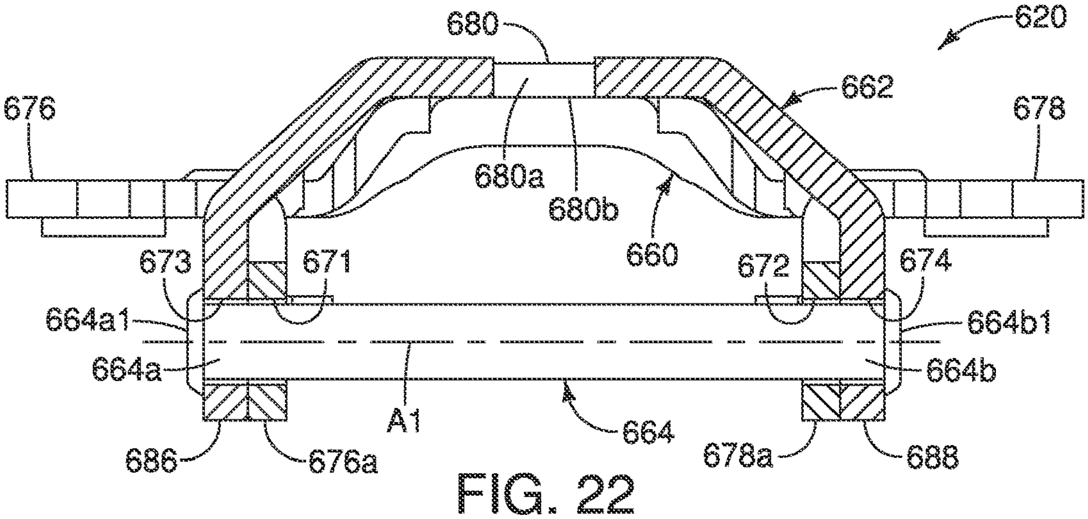
FIG. 22 is a cross-sectional view, similar to FIGS. 15 and 17 to 21, a first coupling member, a second coupling member and a shaft for a coupling unit in accordance with a sixth modification.

Referring now to FIG. 22, a coupling unit 620 is illustrated in accordance with a sixth modification. The coupling unit 620 basically includes a first coupling member 660, the second coupling member 662 and a shaft 664. The first coupling member 660 is identical to the first coupling member 60, discussed above, except that for the connection of the shaft 664 to the first coupling member 660 and the second coupling member 662 is different from the first embodiment. Thus, the parts of the coupling unit 620 that are identical to the parts of the coupling unit 20 will not be described or illustrated herein for the sake of brevity.

The first coupling member 660 has a first hole 671 and a second hole 672. The second coupling member 662 has a third hole 673 and a fourth hole 674. The shaft 664 has a first axial end 664*a* and a second axial end 664*b* opposite to the first axial end 664*a*. The shaft 664 is disposed in the first hole 671, the second hole 672, the third hole 673 and the fourth hole 674 such that the second coupling member 662 is pivotable about the center axis A1. More specifically, the first coupling member 660 includes a first pedal mounted portion 676, a second pedal mounted portion 678 and a cleat engagement portion 680. The first pedal mounted portion 676 includes a first end portion 676*a* having the first hole 671. The second pedal mounted portion 678 includes a second end portion 678*a* having the second hole 672. The cleat engagement portion 680 is configured to engage a front end of the cleat 16. Specifically, the cleat engagement portion 680 has an abutment surface 680*a* and a retaining surface 680*b* similar to the cleat engagement portion 80. Here, the first coupling member 660 is identical to the first coupling member 60, except that t the size of the second hole 672 has been changed, as explained below.

Here, the second coupling member 662 is identical to the second coupling member 62. Similar to the second coupling member 62, the second coupling member 662 includes a first pedal mounted portion 686 having the third hole 673, a second pedal mounted portion 688 having the fourth hole 674, and a cleat engagement portion 690.

In the sixth modification, the shaft 664 is loose-fitted to the first hole 671, the second hole 672, the third hole 673 and the fourth hole 674. Here, both of the first axial end 664*a* and the second axial end 664*b* are crimp-fastened 664*a*1 and 664*b*1 to one of the first coupling member 660 and the second coupling member 662.

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," "portion," "member" or "element" when used in the singular can have the dual meaning of a single part or a plurality of parts unless otherwise stated.

As used herein, the following directional terms "frame facing side", "non-frame facing side", "forward", "rearward", "front", "rear", "up", "down", "above", "below", "upward", "downward", "top", "bottom", "side", "vertical", "horizontal", "perpendicular" and "transverse" as well as any other similar directional terms refer to those directions of a human-powered vehicle (e.g., bicycle) in an upright, riding position and equipped with the coupling unit. Accordingly, these directional terms, as utilized to describe the pedal and/or the coupling unit, should be interpreted relative to a human-powered vehicle (e.g., bicycle) in an upright riding position on a horizontal surface and that is equipped with the pedal. The terms "left" and "right" are used to indicate the "right" when referencing from the right side as viewed from the rear of the human-powered vehicle (e.g., bicycle), and the "left" when referencing from the left side as viewed from the rear of the human-powered vehicle (e.g., bicycle).

The phrase "at least one of" as used in this disclosure means "one or more" of a desired choice. For one example, the phrase "at least one of" as used in this disclosure means "only one single choice" or "both of two choices" if the number of its choices is two. For another example, the phrase "at least one of" as used in this disclosure means "only one single choice" or "any combination of equal to or more than two choices" if the number of its choices is equal to or more than three. Also, the term "and/or" as used in this disclosure means "either one or both of". For instance, the phrase "at least one of A and B" encompasses (1) A alone, (2), B alone, and (3) both A and B. The phrase "at least one of A, B, and C" encompasses (1) A alone, (2), B alone, (3) C alone, (4) both A and B, (5) both B and C, (6) both A and C, and (7) all A, B, and C. In other words, the phrase "at least one of A and B" does not mean "at least one of A and at least one of B" in this disclosure.

Also, it will be understood that although the terms "first" and "second" may be used herein to describe various components, these components should not be limited by these terms. These terms are only used to distinguish one component from another. Thus, for example, a first component discussed above could be termed a second component and vice versa without departing from the teachings of the present invention.

The term "attached" or "attaching", as used herein, encompasses configurations in which an element is directly secured to another element by affixing the element directly to the other element; configurations in which the element is indirectly secured to the other element by affixing the element to the intermediate member(s) which in turn are affixed to the other element; and configurations in which one element is integral with another element, i.e. one element is essentially part of the other element. This definition also applies to words of similar meaning, for example, "joined", "connected", "coupled", "mounted", "bonded", "fixed" and their derivatives. Finally, terms of degree such as "substantially", "about" and "approximately" as used herein mean an amount of deviation of the modified term such that the end result is not significantly changed.

While only selected embodiments have been chosen to illustrate the present invention, it will be apparent to those skilled in the art from this disclosure that various changes and modifications can be made herein without departing from the scope of the invention as defined in the appended claims. For example, unless specifically stated otherwise, the size, shape, location or orientation of the various components can be changed as needed and/or desired so long as the changes do not substantially affect their intended function. Unless specifically stated otherwise, components that are shown directly connected or contacting each other can have intermediate structures disposed between them so long as the changes do not substantially affect their intended function. The functions of one element can be performed by two, and vice versa unless specifically stated otherwise. The structures and functions of one embodiment can be adopted in another embodiment. It is not necessary for all advantages to be present in a particular embodiment at the same time. Every feature which is unique from the prior art, alone or in combination with other features, also should be considered a separate description of further inventions by the applicant, including the structural and/or functional concepts embodied by such feature(s). Thus, the foregoing descriptions of the embodiments according to the present invention are provided for illustration only, and not for the purpose of limiting the invention as defined by the appended claims and their equivalents.

What is claimed is:

1. A coupling unit for a pedal assembly configured to be used with a human-powered vehicle, the coupling unit releasably coupling a cleat of a shoe to the pedal assembly, the coupling unit comprising:

a first coupling member configured to releasably couple the cleat to the coupling unit, the first coupling member being configured to be disposed to a pedal body of the pedal assembly, the first coupling member having a first hole and a second hole, the first coupling member including an outer portion and an inner portion, both the inner portion and the outer portion curving toward each other, and a curvature of the inner portion being different from a curvature of the outer portion;

a second coupling member configured to releasably couple the cleat to the coupling unit, the second coupling member being pivotable between a cleat holding position and a cleat non-holding position, the second coupling member being coupled to the first coupling member, the second coupling member having a third hole and a fourth hole;

a shaft having a center axis, the shaft being disposed in the first hole, the second hole, the third hole and the fourth hole such that the second coupling member is pivotable about the center axis, the shaft being non-rotatably coupled to the first hole and the second hole of the first coupling member; and a biasing member disposed between the first and second coupling members and including a first portion contacting the first coupling member so that the biasing member is in an operational state while the coupling unit is removed from the pedal assembly.

2. The coupling unit according to claim 1, wherein the biasing member biases the second coupling member towards the cleat holding position.

3. The coupling unit according to claim 2, wherein the biasing member is disposed on the shaft.

4. The coupling unit according to claim 3, wherein the biasing member includes a plurality of springs operatively disposed between the first coupling member and the second coupling member.

5. The coupling unit according to claim 4, wherein each of the plurality of springs includes a coil portion disposed on the shaft.

6. The coupling unit according to claim 2, further comprising a biasing force adjuster disposed between the biasing member and the second coupling member.

7. The coupling unit according to claim 1, wherein the inner portion includes an inner engagement recess configured to engage with a positioning profile of the pedal body, and the outer portion includes an outer engagement recess configured to engage with another positioning profile of the pedal body.

8. The coupling unit according to claim 7, wherein the inner engagement recess is different from the outer engagement recess in shape.

9. The coupling unit according to claim 1, wherein the first hole is disposed adjacent to the third hole with respect to an axial direction defined by the center axis of the shaft, and the second hole is adjacent to the fourth hole with respect to the axial direction.

10. The coupling unit according to claim 1, wherein the shaft is press-fitted to the first hole and the second hole.

11. The coupling unit according to claim 1, wherein the first coupling member includes a first pedal mounted portion, a second pedal mounted portion, and a cleat engagement portion connecting the first pedal mounted portion and the second pedal mounted portion.

12. A pedal comprising:

the coupling unit according to claim 1;

a pedal axle having a rotational center axis; and a pedal body rotatably supported with respect to the pedal axle to rotate around the rotational center axis, the coupling unit being attached to the pedal body.

13. The coupling unit according to claim 1, wherein the biasing member includes a second portion contacting a biasing force adjuster.

14. The coupling unit according to claim 1, wherein the first coupling member is configured to releasably couple to a first portion of the cleat and the second coupling member is configured to couple to a second portion of the cleat, the first and second portions being different.

15. A coupling unit for a pedal assembly equipped with a human-powered vehicle, the coupling unit releasably coupling a cleat of a shoe to the pedal assembly, the coupling unit comprising:

a first coupling member configured to releasably couple the cleat to the coupling unit, the first coupling member being configured to be disposed to a pedal body of the pedal assembly, the first coupling member having a first hole and a second hole, the first coupling member including an outer portion and an inner portion, both the inner portion and the outer portion curving toward each other, and a curvature of the inner portion being different from a curvature of the outer portion;

a second coupling member configured to releasably couple the cleat to the coupling unit, the second coupling member being pivotable between a cleat holding position and a cleat non-holding position, the second coupling member being coupled to the first coupling member, the second coupling member having a third hole and a fourth hole;

a shaft having a center axis, the shaft being disposed in the first hole, the second hole, the third hole and the fourth hole such that the second coupling member is pivotable about the center axis, the shaft having a first axial end and a second axial end opposite to the first axial end, both of the first axial end and the second axial end being non rotatably crimp-fastened to one of the first coupling member and the second coupling member; and a biasing member disposed between the first and second coupling members and including a first portion contacting the first coupling member so that the biasing member is operational in a removed state while the coupling unit is removed from the pedal assembly.

16. The coupling unit according to claim 15, wherein the biasing member biases the second coupling member towards the cleat holding position.

17. A pedal comprising:

the coupling unit according to claim 15;

a pedal axle having a rotational center axis; and a pedal body rotatably supported with respect to the pedal axle to rotate around the rotational center axis, the coupling unit being attached to the pedal body.

18. The pedal according to claim 17, wherein the coupling unit further comprises the biasing member biases the second coupling member towards the cleat holding position.

19. A coupling unit for a pedal assembly configured to be used with a human-powered vehicle, the coupling unit releasably coupling a cleat of a shoe to the pedal assembly, the coupling unit comprising:

a first coupling member configured to releasably couple the cleat to the coupling unit, the first coupling member being configured to be disposed to a pedal body of the pedal assembly, the first coupling member having a first hole and a second hole, the first coupling member including an outer portion and an inner portion, both the inner portion and the outer portion curving toward each other, and a curvature of the inner portion being different from a curvature of the outer portion;

a second coupling member configured to releasably couple the cleat to the coupling unit, the second coupling member being pivotable between a cleat holding position and a cleat non-holding position, the second coupling member being coupled to the first coupling member, the second coupling member having a third hole and a fourth hole;

a shaft having a center axis, the shaft being disposed in the first hole, the second hole, the third hole and the fourth hole such that the second coupling member is pivotable about the center axis, the shaft being non-rotatably coupled to the third hole and the fourth hole of the second member; and a biasing member disposed between the first and second coupling members and including a first portion contacting the first coupling member so that the biasing member is in an operational state while the coupling unit is removed from the pedal assembly.

* * * * *